US010565651B2

(12) United States Patent
Bonig

(10) Patent No.: US 10,565,651 B2
(45) Date of Patent: *Feb. 18, 2020

(54) EQUATION-BASED TRANSACTION REQUEST MESSAGING AND TRANSACTION PROCESSING

(71) Applicant: Chicago Mercantile Exchange Inc., Chicago, IL (US)

(72) Inventor: Zachary Bonig, Skokie, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 331 days.

This patent is subject to a terminal disclaimer.

(21) Appl. No.: 15/463,530

(22) Filed: Mar. 20, 2017

(65) Prior Publication Data

US 2018/0268481 A1    Sep. 20, 2018

(51) Int. Cl.
*G06Q 40/04* (2012.01)
*G06Q 40/06* (2012.01)

(52) U.S. Cl.
CPC .......... *G06Q 40/04* (2013.01); *G06Q 40/06* (2013.01)

(58) Field of Classification Search
CPC .............................. G06Q 40/04; G06Q 40/06
USPC ......................................................... 705/37
See application file for complete search history.

(56) References Cited

U.S. PATENT DOCUMENTS

| 5,924,082 | A  | * | 7/1999  | Silverman ............ G06Q 40/00 705/35 |
| 7,039,610 | B2 |   | 5/2006  | Morano et al. |
| 7,567,932 | B1 |   | 7/2009  | Salvadori et al. |
| 7,734,533 | B2 | * | 6/2010  | Mackey, Jr. ........... G06Q 40/04 705/37 |
| 7,831,491 | B2 |   | 11/2010 | Newell et al. |
| 7,849,000 | B2 | * | 12/2010 | Mackey, Jr. ........... G06Q 40/04 705/37 |
| 7,853,499 | B2 |   | 12/2010 | Czupek et al. |
| 8,311,921 | B2 | * | 11/2012 | Lynner ................... G06Q 40/04 705/26.41 |
| 2004/0181474 | A1 | * | 9/2004 | Grubb .................... G06Q 40/00 705/35 |

(Continued)

OTHER PUBLICATIONS

Math Is Fun: "Systems of Linear Equations," https://web.archive.org/web/20160611033521/https://www.mathsisfun.com/algebra/systems-linear-equations.html, Jun. 11, 2016. (Year: 2016).*
Rickard et al., "Optimal Execution of Portfolio Trades," Conference Record of the Thirty-First Asilomar Conference on Signals, Systems and Computers (Cat. No. 97CB36136), IEEE, Nov. 5, 1997. (Year: 1997).*

(Continued)

*Primary Examiner* — Scott S Trotter
*Assistant Examiner* — Joseph F. Ecker
(74) *Attorney, Agent, or Firm* — Lempia Summerfield Katz LLC

(57) ABSTRACT

A data transaction processing system receives and processes equation-based electronic data transaction request messages. Transmitting equation-based electronic data transaction request messages that represent a large series of discrete values reduces the data transmission to the data transaction processing system. Processing equation-based electronic data transaction request messages instead of a series of discrete values reduces the amount of time need to perform transactions, greatly reducing processing latency. Equation-based electronic data transaction request messages can also be efficiently updated by modifying equation parameters, again reducing the amount of data transmitted to the data transaction processing system.

20 Claims, 20 Drawing Sheets

(56) References Cited

U.S. PATENT DOCUMENTS

| | | |
|---|---|---|
| 2005/0096999 A1 | 5/2005 | Newell et al. |
| 2005/0203826 A1 | 9/2005 | Farrell et al. |
| 2006/0036531 A1 | 2/2006 | Jackson |
| 2007/0061233 A1* | 3/2007 | Jovanovic .............. G06Q 40/04 705/36 R |
| 2009/0119224 A1* | 5/2009 | Petrino ................. G06Q 40/04 705/36 R |
| 2014/0006243 A1 | 1/2014 | Boudreault et al. |
| 2015/0073962 A1 | 3/2015 | Bixby et al. |
| 2015/0127513 A1 | 5/2015 | Studnitzer et al. |
| 2015/0127516 A1 | 5/2015 | Studnitzer et al. |
| 2015/0161727 A1 | 6/2015 | Callaway et al. |
| 2016/0092985 A1 | 3/2016 | Shontz |
| 2018/0268481 A1* | 9/2018 | Bonig ................... G06Q 40/06 |

OTHER PUBLICATIONS

Investopedia: "Black Scholes Model," https://web.archive.org/web/20160823055613/https://www.investopedia.com/terms/b/blackscholes.asp, Aug. 23, 2016. (Year: 2016).*

"Black-Scholes Model", Wikipedia, 17 pages, retrieved Mar. 21, 2017, https://en.wikipedia.org/wiki/Black%E2%80%93Scholes_model.

Greeks, Investopedia, 6 pages, retrieved Mar. 21, 2017, http://www.investopedia.com/terms/g/greeks.asp.

John Summa, "Getting to Know the 'Greeks'", Investopedia, 7 pages, retrieved Mar. 21, 2017, http://www.investopedia.com/articles/optioninvestor/02/120602.asp?ad=dirN&qo=investopediaSiteSearch&qsrc=0&o=40186.

Extended European Search Report, from EP Application No. 18162852, dated Mar. 6, 2019, EP.

Extended European Search Report, from EP Application No. 18162856, Jan. 28, 2019, EP.

* cited by examiner

Fig. 16

EQUATION-BASED TRANSACTION REQUEST MESSAGING AND TRANSACTION PROCESSING

BACKGROUND

A data transaction processing system receives electronic data transaction request messages specifying transactions to be performed on one or more instruments at specified values. Some users may submit a large number of electronic data transaction request messages, which can overload the data transaction processing system, increasing processing latency.

Many instruments are interrelated, such as derivative instruments based on a common underlying instrument. Client computers often transmit large numbers of messages to trade derivative instruments, where each message may be for one of many derivative instruments which may be all based on a common underlying instrument. The data transaction processing system then processes each message, which can require a lot of computing resources and time. Moreover, as an underlying instrument changes, and as the state of the electronic marketplace for the underlying instrument changes, users requesting transactions for derivative instruments based thereon may need to update their previously sent messages, increasing the amount of data transmission between client computers and the data transaction processing system. As more data is sent to and processed by the data transaction processing system, the processing latency of the data transaction processing system increases.

As the number of instruments made available for transacting by the data transaction processing system increases, the data transaction processing system expends more computing resources to be able to list, broadcast and maintain information regarding all the instruments.

BRIEF DESCRIPTION OF THE DRAWINGS

FIG. 16 illustrates example order book objects in accordance with the disclosed embodiments.

DETAILED DESCRIPTION

Figure 1:
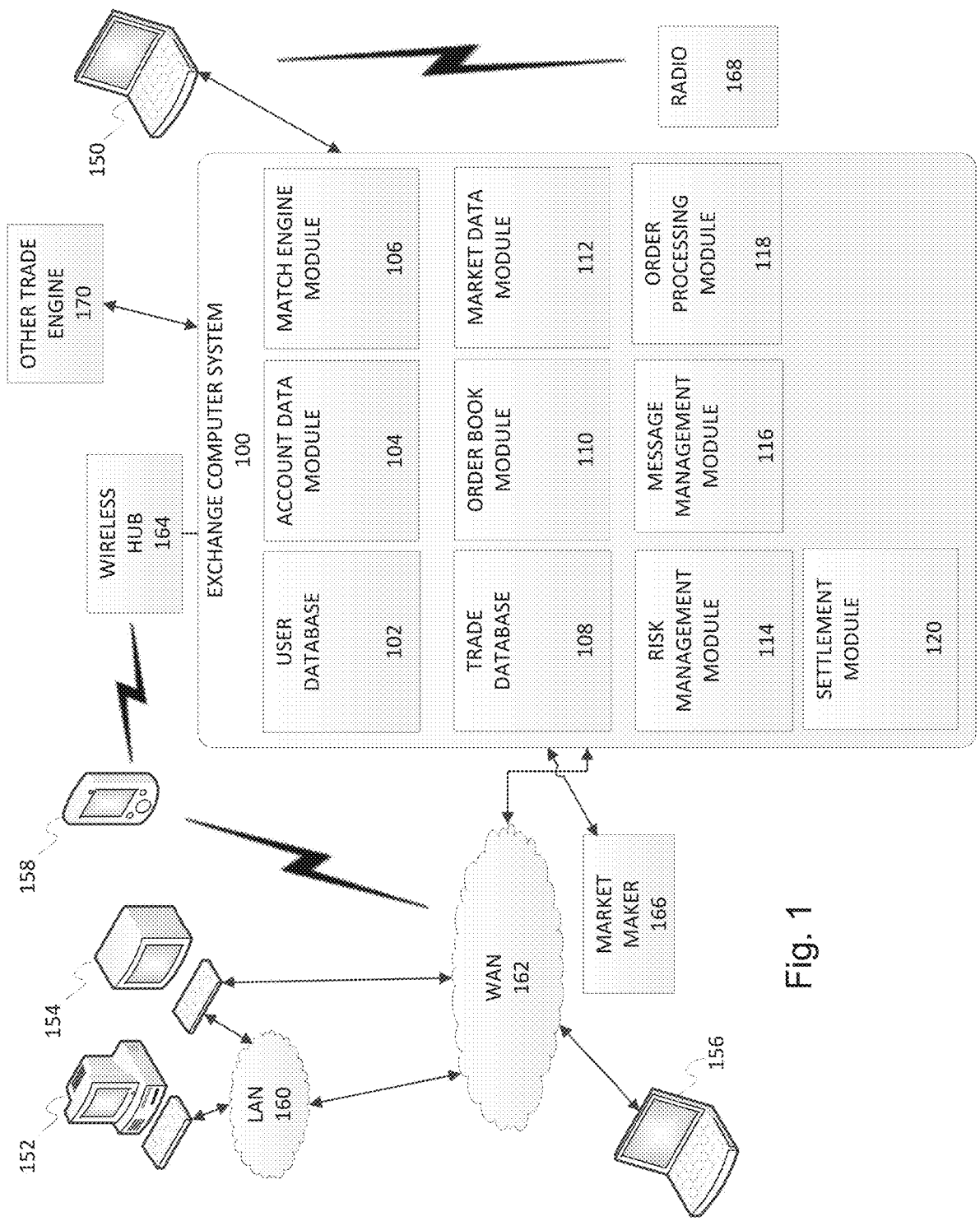
FIG. 1 depicts an illustrative computer network system that may be used to implement aspects of the disclosed embodiments.

The disclosed embodiments relate to a data transaction processing system that receives electronic data transaction request messages including equations (or mathematical expressions) defining relationships between a plurality of variables. The equations may define a mathematical relationship between a first variable at which to perform a transaction of a first type on a first quantity of a data object and a second variable defining a characteristic of the data object. In one embodiment, each different parameter for one of the variables may be a different derivative instrument of a common underlying instrument. The different derivative instruments may be separate financial instruments that trade independently of each other.

One equation-based electronic data transaction request message may be implemented to convey the same information as multiple, e.g., hundreds, of discrete-value-based electronic data transaction request messages, where each discrete-value-based electronic data transaction request message includes a request to perform a transaction at particular, specified parameters. For example, when implemented in an exchange computing system that makes financial instruments available for trading, a discrete-value-based electronic data transaction request message may include a request to perform a transaction at a discrete premium price or value for a specific strike price and/or for a specific maturity. When implemented in an exchange computing system, an equation-based electronic data transaction request message may include a request to perform multiple different transactions, where the equation defines a relationship between different premium prices or values, e.g., a range or set thereof, the trader is willing to pay for different strike prices (parameters for strike price, which can vary for the same underlying financial instrument) and/or different maturities (parameters for maturity, which can vary for the same underlying financial instrument).

The equation-based electronic data transaction request messages are much smaller in size and complexity than discrete-value-based electronic data transaction request messages. Specifically, the disclosed embodiments provide systems and methods for receiving, and performing transactions implementing, equation-based electronic data transaction request messages. The disclosed embodiments enable client computers to submit requests including equations defining a desired set of price points for different derivative instruments, which greatly reduces the amount of messages submitted to the data transaction processing system. A data transaction processing system may typically receive millions of messages per day, so the equation-based electronic data transaction request messages can significantly reduce overall network congestion. In one embodiment, the disclosed embodiments may implement a specific order type and a specific transaction processor, e.g., hardware matching processor, for processing the order type.

Once a user has submitted an equation-based electronic data transaction request message, which may define a large set of values for various strike prices, the user may efficiently and easily modify and manipulate the data set by submitting changes to the submitted equation, as opposed to having to submit a separate modification for each of the strike prices. The disclosed embodiments accordingly also improve on modifying or manipulating a large set of data that may vary quickly with an underlying financial product or object, both by reducing the amount of messages/data which must be sent to accomplish the desired modification but also, thereby, reducing the latency of making such changes.

Users of the data transaction processing system typically submit electronic data transaction request messages to implement a strategy, e.g., a combination of multiple transactions, the results of which are intended to achieve a particular goal. For example, when the data transaction processing system is implemented within a financial exchange computing system, the users may be traders who submit orders to buy or sell different related, but independent, financial instruments at specific values. A trader may use a strategy when he or she wishes to obtain several different options that are based on different changes in the underlying instrument. Traders' strategies may rapidly vary with the state of an electronic marketplace, and may accordingly necessitate submission of many additional electronic data transaction request messages. Equation-based electronic data transaction request messages allow traders to define how their trading strategies are to change with changing trading conditions, creating transactions that automatically adjust to/compensate for such changing conditions without further input from the trader and thus removing the need to modify or cancel previous electronic data transaction request messages as trading conditions change. The data transaction processing system accordingly, in one embodiment, receives equation-based electronic data transaction request messages from client computers.

The data transaction processing system may also be configured to match or attempt to match equation-based electronic data transaction request messages. Instead of checking each discrete value from one electronic data transaction request message against all discrete values from other electronic data transaction request messages for matches for each parameter of a trading variable (e.g., strike price, or maturity date), the data transaction processing system may compare equations to determine if the equations at least intersect, which in turn may indicate that two equation-based electronic data transaction request messages match, and a transaction therebetween should be executed by the data transaction processing system.

An equation-based data transaction processing system greatly reduces the number of recalculations needed to be performed. In the case of trading financial instruments that derive from, or otherwise depend on, other underlying financial instruments, e.g., options contracts that are derivatives of futures, each shift in the trading prices of an underlying may result in recalculations and changes to a massive number of other derivative financial instruments. Thus the disclosed embodiments may be applicable for trading any derivative instrument. Some financial instruments, e.g., spread instruments, are defined as a difference in prices between other financial instruments. Such spread financial instruments, described below, are also affected each time the price of an underlying financial instrument changes. The disclosed equation-based system minimizes the number of recalculations that need to be performed by the client computer each time the price or value of an underlying financial instrument changes. The disclosed equation-based system also minimizes the number of recalculations that need to be performed by the exchange computing system when the price or value of an underlying financial instrument changes. The disclosed embodiments also reduce the overall messaging from client computers to the exchange computing system because the exchange computing system can perform the necessary recalculations upon a change in an underlying financial instrument.

The data transaction processing system, may, in one embodiment, operate in a stateful manner, i.e., depend upon historical/prior messages received, and/or rely upon previous results thereof or previous decisions made, by the transaction processing system. The data transaction processing system may also access data structures storing information about a current environment state to determine if orders or messages match.

The disclosed embodiments also improve upon the technical field of networking by compressing data by using a much smaller number of electronic data transaction request messages, which require less bandwidth for transmission and less storage, thereby improving network transmission speeds and reducing network congestion of messages transmitted to a transaction processor. The disclosed embodiments also improve on the field of data processing by improving the efficiency and speed with which matches or transactions are performed on a large set of data. The disclosed embodiments also improve upon the technical field of data processing by enabling a transaction processor to quickly identify acceptable transactions by comparing equations. The disclosed system is a specific implementation and practical application of a transaction processor that matches equation-based electronic data transaction request messages by identifying intersections/overlapping ranges between multiple equations.

At least some of the problems solved by the disclosed encoding system are specifically rooted in technology, specifically in data communications where a large volume of messages is transmitted over a network to a transaction processor, and the messages are frequently updated/modified by the submitter or because the messages derive from an underlying that is constantly fluctuating, and are solved by means of a technical solution, namely, enabling orders/requests to define equations that can encompass many values across multiple different parameters of different financial instruments. The disclosed embodiments solve a communications network-centric problem of sending large amounts of inter-related messages (e.g., for inter-related financial instruments, or for different parameters of a variable) all configured to be executed/processed immediately upon receipt. Accordingly, the resulting problem is a problem arising in computer systems due to the high volume of disparate but inter-related messages processed by an exchange computing system. The solutions disclosed herein are, in one embodiment, implemented as automatic responses and actions by an exchange computing system computer.

The disclosed embodiments may be directed to an exchange computing system that includes multiple hardware matching processors that match, or attempt to match, electronic data transaction request messages with other electronic data transaction request messages counter thereto. Incoming electronic data transaction request messages may be received from different client computers over a data communication network, and output electronic data transaction result messages may be transmitted to the client computers and may be indicative of results of the attempts to match incoming electronic data transaction request messages.

The disclosed embodiments may be implemented in a data transaction processing system that processes data items or objects. Customer or user devices (e.g., computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a range of values defined equations. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value. The data transaction processing system may include various specifically configured matching processors that match, e.g., automatically, electronic data transaction request messages for the same one of the data items. The specifically configured matching processors may match, or attempt to match, electronic data transaction request messages based on multiple transaction matching parameters from the different client computers. The specifically configured matching processors may additionally generate information indicative of a state of an environment (e.g., the state of the order book) based on the processing, and report this information to data recipient computing systems via outbound messages published via one or more data feeds.

For example, one exemplary environment where efficient network utilization and transaction processing is desirable is in financial markets, and in particular, electronic financial exchanges, such as a futures exchange, such as the Chicago Mercantile Exchange Inc. (CME).

Exchange Computing System

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

A match engine within a financial instrument trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high volume messaging activity. With limited processing capacity, high messaging volumes may increase the response time or latency experienced by market participants.

The disclosed embodiments recognize that electronic messages such as incoming messages from market participants, i.e., "outright" messages, e.g., trade order messages, etc., are sent from client devices associated with market participants, or their representatives, to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request.

Electronic Data Transaction Request Messages

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. In particular, in one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

Financial messages communicated to the electronic trading system, also referred to as "inbound" messages, may include associated actions that characterize the messages, such as trader orders, order modifications, order cancellations and the like, as well as other message types. Inbound messages may be sent from market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" e.g., Aggregated By Value ("ABV") book, or Market By Order "MBO", e.g., Per Order ("PO") book format). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

It should be further appreciated that various types of market data feeds may be provided which reflect different markets or aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order or Per Order, Market Depth (also known as Market by Price or Aggregated By Value to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index.

Market data feeds may be characterized as providing a "view" or "overview" of a given market, an aggregation or a portion thereof or changes thereto. For example, a market data feed, such as a Market By Price ("MBP") feed, also known as an Aggregated By Value ("ABV") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the individual resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MBO") feed also known as a Per Order ("PO") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO/PO messages may carry much more data than MBP/ABV messages because MBO/PO messages reflect information about each order, whereas MBP/ABV messages contain information about orders affecting some predetermined value levels. Furthermore, because specific orders, but not the submitting traders thereof, are identified, other market participants may be able to follow that order as it progresses through the market, e.g., as it is modified, canceled, traded, etc.

An ABV book data object may include information about multiple values. The ABV book data object may be arranged and structured so that information about each value is aggregated together. Thus, for a given value V, the ABV book data object may aggregate all the information by value, such as for example, the number of orders having a certain position at value V, the quantity of total orders resting at value V, etc. Thus, the value field may be the key, or may be a unique field, within an ABV book data object. In one embodiment, the value for each entry within the ABV book data object is different. In one embodiment, information in an ABV book data object is presented in a manner such that the value field is the most granular field of information.

A PO book data object may include information about multiple orders. The PO book data object may be arranged and structured so that information about each order is represented. Thus, for a given order O, the PO book data object may provide all of the information for order O. Thus, the order field may be the key, or may be a unique field, within a PO book data object. In one embodiment, the order ID for each entry within the PO book data object is different. In one embodiment, information in a PO book data object is presented in a manner such that the order field is the most granular field of information.

Thus, the PO book data object may include data about unique orders, e.g., all unique resting orders for a product, and the ABV book data object may include data about unique values, e.g., up to a predetermined level, e.g., top ten price or value levels, for a product.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. MBP/ABV and MBO/PO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancellation, an order modification, etc., are fairly simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

In one embodiment, an exchange computing system may generate multiple order book objects, one for each type of view that is published or provided. For example, the system may generate a PO book object and an ABV book object. It should be appreciated that each book object, or view for a product or market, may be derived from the Per Order book object, which includes all the orders for a given financial product or market.

An inbound message may include an order that affects the PO book object, the ABV book object, or both. An outbound message may include data from one or more of the structures within the exchange computing system, e.g., the PO book object queues or the ABV book object queues.

Furthermore, each participating trader needs to receive a notification that their particular order has traded. Continuing with the example, this may require sending 5001 individual trade notification messages, or even 10,000+ messages where each contributing side (buy vs. sell) is separately reported, in addition to the notification sent to all of the market participants.

As detailed in U.S. patent application Ser. No. 14/100,788, the entirety of which is incorporated by reference herein and relied upon, it may be recognized that trade notifications sent to all market participants may include redundant information repeated for each participating trade and a structure of an MBP trade notification message may be provided which results in a more efficient communication of the occurrence of a trade. The message structure may include a header portion which indicates the type of transaction which occurred, i.e., a trade, as well as other general information about the event, an instrument portion which comprises data about each instrument which was traded as part of the transaction, and an order portion which comprises data about each participating order. In one embodiment, the header portion may include a message type, Transaction Time, Match Event Indicator, and Number of Market Data Entries ("No. MD Entries") fields. The instrument portion may include a market data update action indicator ("MD Update Action"), an indication of the Market Data Entry Type ("MD Entry Type"), an identifier of the instrument/security involved in the transaction ("Security ID"), a report sequence indicator ("Rpt Seq"), the price at which the instrument was traded ("MD Entry PX"), the aggregate quantity traded at the indicated price ("ConsTradeQty"), the number of participating orders ("NumberOfOrders"), and an identifier of the aggressor side ("Aggressor Side") fields. The order portion may further include an identifier of the participating order ("Order ID"), described in more detail below, and the quantity of the order traded ("MD Entry Size") fields. It should be appreciated that the particular fields included in each portion are implementation dependent and that different fields in addition to, or in lieu of, those listed may be included depending upon the implementation. It should be appreciated that the exemplary fields can be compliant with the FIX binary and/or FIX/FAST protocol for the communication of the financial information.

The instrument portion contains a set of fields, e.g., seven fields accounting for 23 bytes, which are repeated for each participating instrument. In complex trades, such as trades involving combination orders or strategies, e.g., spreads, or implied trades, there may be multiple instruments being exchanged among the parties. In one embodiment, the order portion includes only one field, accounting for 4 bytes, for each participating order which indicates the quantity of that order which was traded. As will be discussed below, the order portion may further include an identifier of each order, accounting for an additional 8 bytes, in addition to the quantity thereof traded. As should be appreciated, data which would have been repeated for each participating order, is consolidated or otherwise summarized in the header and instrument portions of the message thereby eliminating redundant information and, overall, significantly reducing the size of the message.

While the disclosed embodiments will be discussed with respect to an MBP market data feed, it should be appreciated that the disclosed embodiments may also be applicable to an MBO market data feed.

Market Segment Gateway

In one embodiment, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple markets, and because the electronic trading system includes one MSG for each market/product implemented thereby, the electronic trading system may include multiple MSGs. For more detail on deterministic operation in a trading system, see U.S. patent application Ser. No. 14/074,667 entitled "Transactionally Deterministic High Speed Financial Exchange Having Improved, Efficiency, Communication, Customization, Performance, Access, Trading Opportunities, Credit Controls, And Fault Tolerance" and filed on Nov. 7, 2013, the entire disclosure of which is incorporated by reference herein and relied upon.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

An MSG or Market Segment Gateway may be utilized for the purpose of deterministic operation of the market. Transactions for a particular market may be ultimately received at the electronic trading system via one or more points of entry, e.g., one or more communications interfaces, at which the disclosed embodiments apply determinism, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. For more detail on deterministic operation in a trading system, see U.S. patent application Ser. No. 14/074,675, filed on Nov. 7, 2013, published as U.S. Patent Publication No. 2015/0127516 ("the '516 Publication"), entitled "Transactionally Deterministic High Speed Financial Exchange Having Improved, Efficiency, Communication, Customization, Performance, Access, Trading Opportunities, Credit Controls, And Fault Tolerance", the entirety of which is incorporated by reference herein and relied upon.

Electronic Trading

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g. implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. In addition, it may be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

Trading Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, and N, that is to say, any combination of one or more of the elements A, B, . . . or N including any one element alone or in combination with one or more of the other elements which may also include, in combination, additional elements not listed.

Figure 2:
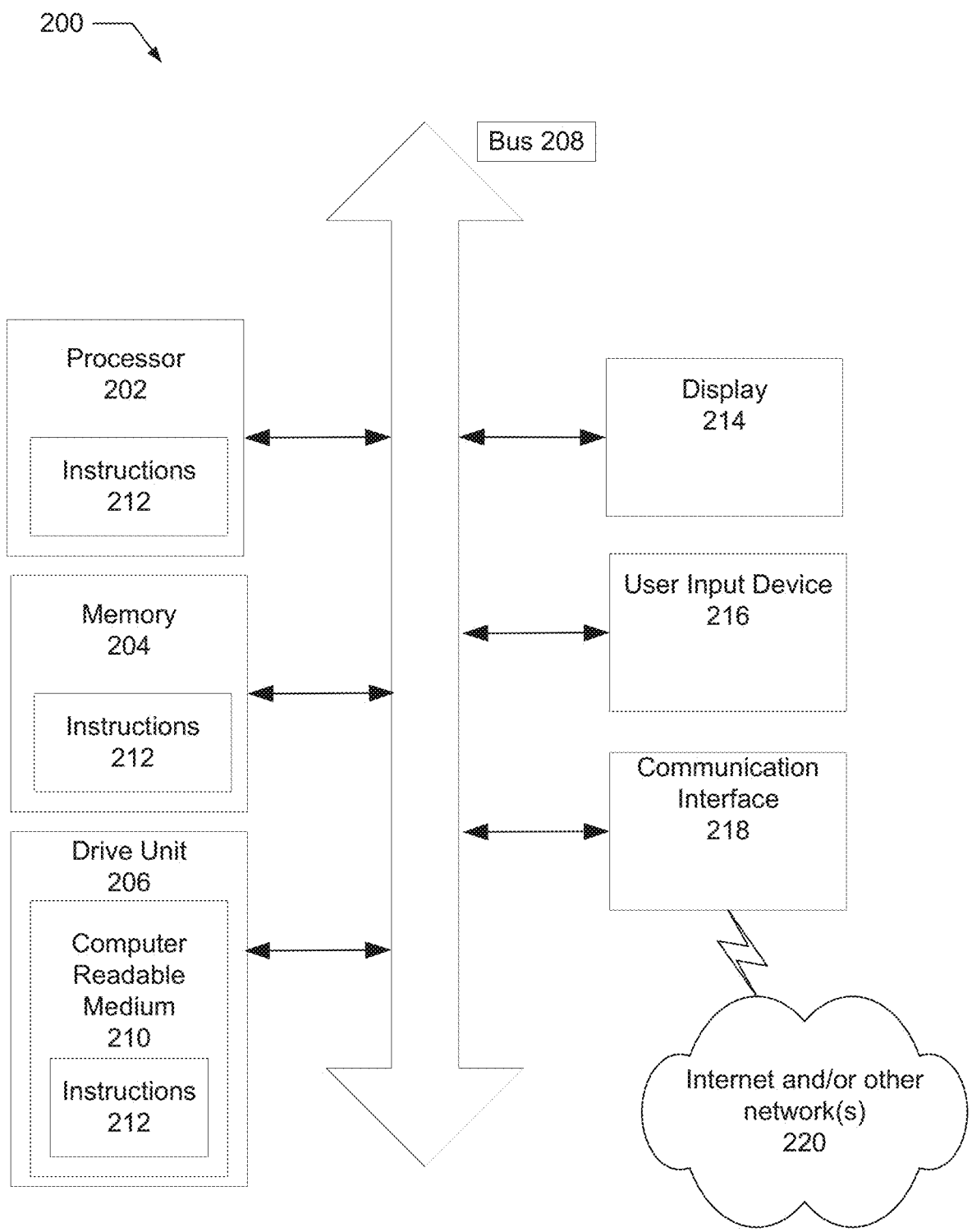
FIG. 2 depicts an illustrative embodiment of a general computer system for use with the disclosed embodiments.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 118 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements, and may be configured as part of the order book module 110, part of the message management module 118, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 114, the message management module 116, the order processing module 118, the settlement module 120, or other component of the exchange computer system 100.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via WiFi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as the processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like.

In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The embodiments described herein utilize trade related electronic messages such as mass quote messages, individual order messages, modification messages, cancellation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, the market may operate using characteristics that involve collecting orders over a period of time, such as a batch auction market. In such an embodiment, the period of time may be considered an order accumulation period. The period of time may involve a beginning time and an ending time, with orders placed in the market after the beginning time, and the placed order matched at or after the ending time. As such, the action associated with an order extracted from a message may involve placing the order in the market within the period of time. Also, electronic messages may be received prior to or after the beginning time of the period of time.

The electronic messages may also include other data relating to the order. In an embodiment, the other data may be data indicating a particular time in which the action is to be executed. As such, the order may be considered a temporally specific order. The particular time in which an action is undertaken may be established with respect to any measure of absolute or relative time. In an embodiment, the time in which an action is undertaken may be established with reference to the beginning time of the time period or ending time of the time period in a batch auction embodiment. For example, the particular time may be a specific amount of time, such as 10 milliseconds, prior to the ending time of an order accumulation period in the batch auction. Further, the order accumulation period may involve dissecting the accumulation period into multiple consecutive, overlapping, or otherwise divided, sub-periods of time. For example, the sub-periods may involve distinct temporal windows within the order accumulation period. As such, the particular time may be an indicator of a particular temporal window during the accumulation period. For example, the particular time may be specified as the last temporal window prior to the ending time of the accumulation period.

In an embodiment, the electronic message may also include other actions to be taken with respect to the order. These other actions may be actions to be executed after the initial or primary action associated with the order. For example, the actions may involve modifying or canceling an already placed order. Further, in an embodiment, the other data may indicate order modification characteristics. For example, the other data may include a price or volume change in an order. The other actions may involve modifying the already placed order to align with the order modification characteristics, such as changing the price or volume of the already placed order.

In an embodiment, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of officials related to a product being bought or sold in the electronic market, and/or any other event or combination of events which may be detected by an electronic trading system.

In an embodiment, the action, or a primary action, associated with an order may be executed. For example, an order extracted from electronic message order characteristics may be placed into a market, or an electronic order book for a market, such that the order may be matched with other orders counter thereto.

In an embodiment involving a market operating using batch auction principles, the action, such as placing the order, may be executed subsequent to the beginning time of the order accumulation period, but prior to the ending time of the order accumulation period. Further, as indicated above, a message may also include other information for the order, such as a particular time the action is to be executed. In such an embodiment, the action may be executed at the particular time. For example, in an embodiment involving a batch auction process having sub-periods during an order accumulation period, an order may be placed during a specified sub-period of the order accumulation period. The disclosed embodiments may be applicable to batch auction processing, as well as continuous processing.

Also, it may be noted that messages may be received prior or subsequent to the beginning time of an order accumulation period. Orders extracted from messages received prior to the beginning time may have the associated actions, or primary actions such as placing the order, executed at any time subsequent to the beginning time, but prior to the ending time, of the order accumulation period when no particular time for the execution is indicated in the electronic message. In an embodiment, messages received prior to the beginning time but not having a particular time specified will have the associated action executed as soon as possible after the beginning time. Because of this, specifying a time for order action execution may allow a distribution and more definite relative time of order placement so as to allow resources of the electronic trading system to operate more efficiently.

In an embodiment, the execution of temporally specific messages may be controlled by the electronic trading system such that a limited or maximum number may be executed in any particular accumulation period, or sub-period. In an embodiment, the order accumulation time period involves a plurality of sub-periods involving distinct temporal windows, a particular time indicated by a message may be indicative of a particular temporal window of the plurality of temporal windows, and the execution of the at least one temporally specific message is limited to the execution of a specified sub-period maximum number of temporally specific messages during a particular sub-period. The electronic trading system may distribute the ability to submit temporally specific message to selected market participants. For example, only five temporally specific messages may be allowed in any one particular period or sub-period. Further, the ability to submit temporally specific messages within particular periods or sub-periods may be distributed based on any technique. For example, the temporally specific messages for a particular sub-period may be auctioned off or otherwise sold by the electronic trading system to market participants. Also, the electronic trading system may distribute the temporally specific messages to preferred market participants, or as an incentive to participate in a particular market.

In an embodiment, an event occurrence may be detected. The event occurrence may be the occurrence of an event that was specified as other information relating to an order extracted from an electronic message. The event may be a triggering event for a modification or cancellation action associated with an order. The event may be detected subsequent to the execution of the first action when an electronic message further comprises the data representative of the event and a secondary action associated with the order. In an embodiment involving a market operating on batch auction principles, the event may be detected subsequent to the execution of a first action, placing an order, but prior to the ending time of an order accumulation period in which the action was executed.

In an embodiment, other actions associated with an order may be executed. The other actions may be any action associated with an order. For example, the action may be a conditional action that is executed in response to a detection of an occurrence of an event. Further, in a market operating using batch auction principles, the conditional action may be executed after the placement of an order during an order accumulation period, but in response to a detection of an occurrence of an event prior to an ending time of the order accumulation period. In such an embodiment, the conditional action may be executed prior to the ending time of the order accumulation period. For example, the placed order may be canceled, or modified using other provided order characteristics in the message, in response to the detection of the occurrence of the event.

An event may be a release of an economic statistic or a fluctuation of prices in a correlated market. An event may also be a perceptible change in market sentiment of a correlated market. A change may be perceptible based on a monitoring of orders or social media for keywords in reference to the market in question. For example, electronic trading systems may be configured to be triggered for action by a use of keywords during a course of ongoing public statements of officials who may be in a position to impact markets, such as Congressional testimony of the Chairperson of the Federal Reserve System.

The other or secondary action may also be considered a modification of a first action executed with respect to an order. For example, a cancellation may be considered a cancellation of the placement of the order. Further, a secondary action may have other data in the message which indicates a specific time in which the secondary action may be executed. The specific time may be a time relative to a first action, placement of the order, or relative to an accumulation period in a batch auction market. For example, the specific time for execution of the secondary action may be at a time specified relative and prior to the ending period of the order accumulation period. Further, multiple secondary actions may be provided for a single order. Also, with each secondary action a different triggering event may be provided.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail herein. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be stored. The data may be stored in any device, or using any technique, operable to store and provide recovery of data. For example, a memory 204 or computer readable medium 210, may be used to store data, as is described with respect to FIG. 2. The acts of the process as described herein may also be repeated. As such, data for multiple received transactions for multiple market participants may be stored and used as describe herein.

The order processing module 118 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 118 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 118 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. Such priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 118, and used for determining MQI scores of market participants.

Example Users

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Matching and Transaction Processing

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for relinquish or sell transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include:
  Price Explicit Time
  Order Level Pro Rata
  Order Level Priority Pro Rata
  Preference Price Explicit Time
  Preference Order Level Pro Rata
  Preference Order Level Priority Pro Rata
  Threshold Pro-Rata
  Priority Threshold Pro-Rata
  Preference Threshold Pro-Rata
  Priority Preference Threshold Pro-Rata
  Split Price-Time Pro-Rata For example, the Price Explicit Time trading policy is based on the basic Price Time trading policy with Explicit Orders having priority over Implied Orders at the same price level. The order of traded volume allocation at a single price level may therefore be:
  Explicit order with oldest timestamp first. Followed by
  Any remaining explicit orders in timestamp sequence (First In, First Out—FIFO) next. Followed by
  Implied order with oldest timestamp next. Followed by
  Any remaining implied orders in timestamp sequence (FIFO).

In Order Level Pro Rata, also referred to as Price Pro Rata, priority is given to orders at the best price (highest for a bid, lowest for an offer). If there are several orders at this best price, equal priority is given to every order at this price and incoming business is divided among these orders in proportion to their order size. The Pro Rata sequence of events is:

1. Extract all potential matching orders at best price from the order book into a list.
2. Sort the list by order size, largest order size first. If equal order sizes, oldest timestamp first. This is the matching list.
3. Find the 'Matching order size, which is the total size of all the orders in the matching list.
4. Find the 'tradable volume', which is the smallest of the matching volume and the volume left to trade on the incoming order.
5. Allocate volume to each order in the matching list in turn, starting at the beginning of the list. If all the tradable volume gets used up, orders near the end of the list may not get allocation.
6. The amount of volume to allocate to each order is given by the formula:

(Order volume/Matching volume)*Tradable volume

The result is rounded down (for example, 21.99999999 becomes 21) unless the result is less than 1, when it becomes 1.

7. If tradable volume remains when the last order in the list had been allocated to, return to step 3.

Note: The matching list is not re-sorted, even though the volume has changed. The order which originally had the largest volume is still at the beginning of the list.

8. If there is still volume left to trade on the incoming order, repeat the entire algorithm at the next price level.

Order Level Priority Pro Rata, also referred to as Threshold Pro Rata, is similar to the Price (or 'Vanilla') Pro Rata algorithm but has a volume threshold defined. Any pro rata allocation below the threshold will be rounded down to 0. The initial pass of volume allocation is carried out in using pro rata; the second pass of volume allocation is carried out using Price Explicit Time. The Threshold Pro Rata sequence of events is:

1. Extract all potential matching orders at best price from the order book into a list.
2. Sort the list by explicit time priority, oldest timestamp first. This is the matching list.
3. Find the 'Matching volume', which is the total volume of all the orders in the matching list.
4. Find the 'tradable volume', which is the smallest of the matching volume and the volume left to trade on the incoming order.
5. Allocate volume to each order in the matching list in turn, starting at the beginning of the list.
6. The amount of volume to allocate to each order is given by the formula:

(Order volume/Matching volume)*Tradable volume

The result is rounded down to the nearest lot (for example, 21.99999999 becomes 21) unless the result is less than the defined threshold in which case it is rounded down to 0.

7. If tradable volume remains when the last order in the list had been allocated to, the remaining volume is allocated in time priority to the matching list.

8. If there is still volume left to trade on the incoming order, repeat the entire algorithm at the next price level.

In the Split Price Time Pro-Rata algorithms, a Price Time Percentage parameter is defined. This percentage of the matching volume at each price is allocated by the Price Explicit Time algorithm and the remainder is allocated by the Threshold Pro-Rata algorithm. There are four variants of this algorithm, with and without Priority and/or Preference. The Price Time Percentage parameter is an integer between 1 and 99. (A percentage of zero would be equivalent to using the respective existing Threshold Pro-Rata algorithm, and a percentage of 100 would be equivalent to using the respective existing Price Time algorithm). The Price Time Volume will be the residual incoming volume, after any priority and/or Preference allocation has been made, multiplied by the Price Time Percentage. Fractional parts will be rounded up, so the Price Time Volume will always be at least 1 lot and may be the entire incoming volume. The Price Time Volume is allocated to resting orders in strict time priority. Any remaining incoming volume after the Price Time Volume has been allocated will be allocated according to the respective Threshold Pro-Rata algorithm. The sequence of allocation, at each price level, is therefore:

1. Priority order, if applicable
2. Preference allocation, if applicable
3. Price Time allocation of the configured percentage of incoming volume
4. Threshold Pro-Rata allocation of any remaining incoming volume
5. Final allocation of any leftover lots in time sequence.

Any resting order may receive multiple allocations from the various stages of the algorithm.

It will be appreciated that there may be other allocation algorithms, including combinations of algorithms, now available or later developed, which may be utilized with the disclosed embodiments, and all such algorithms are contemplated herein. In one embodiment, the disclosed embodiments may be used in any combination or sequence with the allocation algorithms described herein.

One exemplary system for matching is described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon, discloses an adaptive match engine which draws upon different matching algorithms, e.g., the rules which dictate how a given order should be allocated among qualifying resting orders, depending upon market conditions, to improve the operation of the market. For example, for a financial product, such as a futures contract, having a future expiration date, the match engine may match incoming orders according to one algorithm when the remaining time to expiration is above a threshold, recognizing that during this portion of the life of the contract, the market for this product is likely to have high volatility. However, as the remaining time to expiration decreases, volatility may decrease. Accordingly, when the remaining time to expiration falls below the threshold, the match engine switches to a different match algorithm which may be designed to encourage trading relative to the declining trading volatility. Thereby, by conditionally switching among matching algorithms within the same financial product, as will be described, the disclosed match engine may automatically adapt to the changing market conditions of a financial product, e.g., a limited life product, in a non-preferential manner, maintaining fair order allocation while improving market liquidity, e.g., over the life of the product.

In one implementation, the system may evaluate market conditions on a daily basis and, based thereon, change the matching algorithm between daily trading sessions, i.e., when the market is closed, such that when the market reopens, a new trading algorithm is in effect for the particular product. As will be described, the disclosed embodiments may facilitate more frequent changes to the matching algorithms so as to dynamically adapt to changing market conditions, e.g., intra-day changes, and even intra-order matching changes. It will be further appreciated that hybrid matching algorithms, which match part of an order using one algorithm and another part of the order using a different algorithm, may also be used.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

As described above, matching systems apply a single algorithm, or combined algorithm, to all of the orders received for a particular financial product to dictate how the entire quantity of the incoming order is to be matched/allocated. In contrast, the disclosed embodiments may apply different matching algorithms, singular or combined, to different orders, as will be described, recognizing that the allocation algorithms used by the trading host for a particular market may, for example, affect the liquidity of the market. Specifically, some allocation algorithms may encourage traders to submit more orders, where each order is relatively small, while other allocation algorithms encourage traders to submit larger orders. Other allocation algorithms may encourage a trader to use an electronic trading system that can monitor market activity and submit orders on behalf of the trader very quickly and without intervention. As markets and technologies available to traders evolve, the allocation algorithms used by trading hosts must also evolve accordingly to enhance liquidity and price discovery in markets, while maintaining a fair and equitable market.

FIFO generally rewards the first trader to place an order at a particular price and maintains this reward indefinitely.

So if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Spread Instruments

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly} = \text{Leg1} - 2 \times \text{Leg2} + \text{Leg3} \qquad \text{(equation 1)}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Implication

Thus an exchange may match outright orders, such as individual contracts or spread orders (which as discussed herein could include multiple individual contracts). The exchange may also imply orders from outright orders. For example, exchange computer system 100 may derive, identify and/or advertise, publish, display or otherwise make available for trading orders based on outright orders.

As was described above, the financial instruments which are the subject of the orders to trade, may include one or more component financial instruments. While each financial instrument may have its own order book, i.e. market, in which it may be traded, in the case of a financial instrument having more than one component financial instrument, those component financial instruments may further have their own order books in which they may be traded. Accordingly, when an order for a financial instrument is received, it may be matched against a suitable counter order in its own order book or, possibly, against a combination of suitable counter orders in the order books the component financial instruments thereof, or which share a common component financial instrument. For example, an order for a spread contract comprising component financial instruments A and B may be matched against another suitable order for that spread contract. However, it may also be matched against suitable separate counter orders for the A and for the B component financial instruments found in the order books therefore. Similarly, if an order for the A contract is received and suitable match cannot be found in the A order book, it may be possible to match order for A against a combination of a suitable counter order for a spread contract comprising the A and B component financial instruments and a suitable counter order for the B component financial instrument. This is referred to as "implication" where a given order for a financial instrument may be matched via a combination of suitable counter orders for financial instruments which share common, or otherwise interdependent, component financial instruments. Implication increases the liquidity of the market by providing additional opportunities for orders to be traded. Increasing the number of transactions may further increase the number of transaction fees collected by the electronic trading system.

The order for a particular financial instrument actually received from a market participant, whether it comprises one or more component financial instruments, is referred to as a "real" or "outright" order, or simply as an outright. The one or more orders which must be synthesized and submitted into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implication" or "implied matching", the identified orders being referred to as an "implied match." Depending on the number component financial instruments involved, and whether those component financial instruments further comprise component financial instruments of their own, there may be numerous different implied matches identified which would allow the incoming order to be at least partially matched and mechanisms may be provided to arbitrate, e.g., automatically, among them, such as by picking the implied match comprising the least number of component financial instruments or the least number of synthesized orders.

Upon receipt of an incoming order, or thereafter, a combination of one or more suitable/hypothetical counter orders which have not actually been received but if they were received, would allow at least a partial trade of the incoming order to be executed, may be, e.g., automatically, identified or derived and referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed, electronically communicated to the market participants, to appear available to trade in order to solicit the desired orders from the market participants. Depending on the number component financial instruments involved, and whether those component financial instruments further comprise component financial instruments of their own, there may be numerous implied opportunities, the submission of a counter order in response thereto, would allow the incoming order to be at least partially matched.

Implied opportunities, e.g. the advertised synthetic orders, may frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied opportunities at better prices will encourage traders to enter the opposing orders to trade with them. The more implied opportunities that the match engine of an electronic trading system can calculate/derive, the greater this encouragement will be and the more the Exchange will benefit from increased transaction volume. However, identifying implied opportunities may be computationally intensive. In a high performance trading system where low transaction latency is important, it may be important to identify and advertise implied opportunities quickly so as to improve or maintain market participant interest and/or market liquidity.

For example, two different outright orders may be resting on the books, or be available to trade or match. The orders may be resting because there are no outright orders that match the resting orders. Thus, each of the orders may wait or rest on the books until an appropriate outright counter-offer comes into the exchange or is placed by a user of the exchange. The orders may be for two different contracts that only differ in delivery dates. It should be appreciated that such orders could be represented as a calendar spread order. Instead of waiting for two appropriate outright orders to be placed that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the match engine is configured to detect that the two resting orders may be combined into an order in the spread instrument and accordingly creates an implied order.

In other words, the exchange's matching system may imply the counteroffer order by using multiple orders to create the counteroffer order. Examples of spreads include implied IN, implied OUT, 2nd- or multiple-generation, crack spreads, straddle, strangle, butterfly, and pack spreads.

Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. An implied IN or implied OUT spread may be created when an electronic match system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs.

Implied orders, unlike real orders, are generated by electronic trading systems. In other words, implied orders are computer generated orders derived from real orders. The system creates the "derived" or "implied" order and provides the implied order as a market that may be traded against. If a trader trades against this implied order, then the real orders that combined to create the implied order and the resulting market are executed as matched trades. Implied orders generally increase overall market liquidity. The creation of implied orders increases the number of tradable items, which has the potential of attracting additional traders. Exchanges benefit from increased transaction volume. Transaction volume may also increase as the number of matched trade items increases.

Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets" ("the '962 Publication"), the entire disclosure of which is incorporated by reference herein and relied upon. Settlement price determination techniques may be implemented to cover calendar month spread instruments having different deferred month contracts.

Order Book Object Data Structures

Figure 3A:
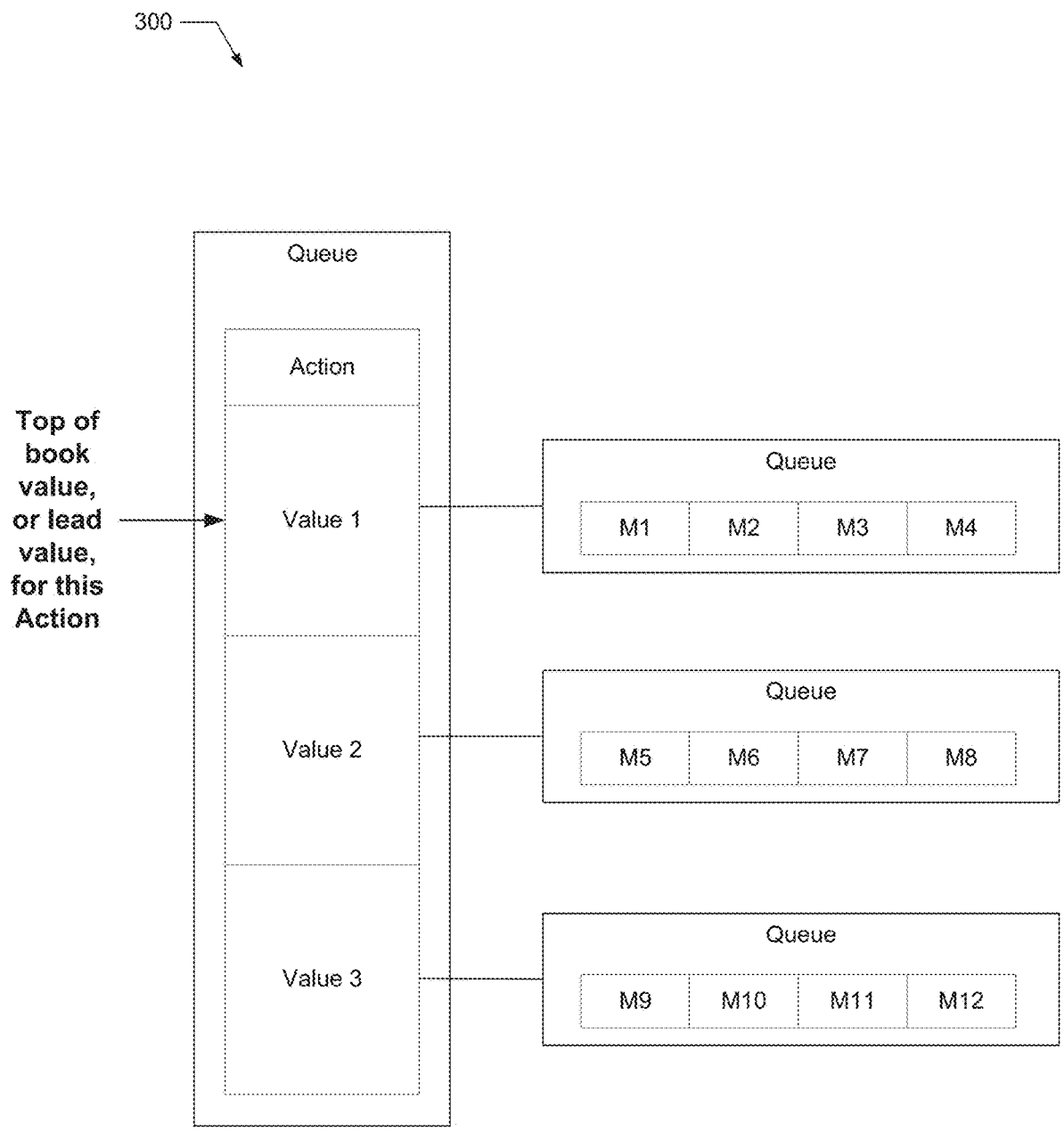
FIG. 3A depicts an illustrative embodiment of a data structure used to implement aspects of the disclosed embodiments.

In one embodiment, the messages and/or values received for each object may be stored in queues according to value and/or priority techniques implemented by an exchange computing system 100. FIG. 3A illustrates an example data structure 300, which may be stored in a memory or other storage device, such as the memory 204 or storage device 206 described with respect to FIG. 2, for storing and retrieving messages related to different values for the same action for an object. For example, data structure 300 may be a set of queues or linked lists for multiple values for an action, e.g., bid, on an object. Data structure 300 may be implemented as a database. It should be appreciated that the system may store multiple values for the same action for an object, for example, because multiple users submitted messages to buy specified quantities of an object at different values. Thus, in one embodiment, the exchange computing system may keep track of different orders or messages for buying or selling quantities of objects at specified values.

Although the application contemplates using queue data structures for storing messages in a memory, the implementation may involve additional pointers, i.e., memory address pointers, or linking to other data structures. Incoming messages may be stored at an identifiable memory address. The transaction processor can traverse messages in order by pointing to and retrieving different messages from the different memories. Thus, messages that may be depicted sequentially, e.g., in FIG. 3B below, may actually be stored in memory in disparate locations. The software programs implementing the transaction processing may retrieve and process messages in sequence from the various disparate (e.g., random) locations. Thus, in one embodiment, each queue may store different values, which could represent prices, where each value points to or is linked to the messages (which may themselves be stored in queues and sequenced according to priority techniques, such as prioritizing by value) that will match at that value. For example, as shown in FIG. 3A, all of the values relevant to executing an action at different values for an object are stored in a queue. Each value in turn points to, e.g., a linked list or queue logically associated with the values. The linked list stores the messages that instruct the exchange computing system to buy specified quantities of the object at the corresponding value.

The sequence of the messages in the message queues connected to each value may be determined by exchange implemented priority techniques. For example, in FIG. 3A, messages M1, M2, M3 and M4 are associated with performing an action (e.g., buying or selling) a certain number of units (may be different for each message) at Value 1. M1 has priority over M2, which has priority over M3, which has priority over M4. Thus, if a counter order matches at Value 1, the system fills as much quantity as possible associated with M1 first, then M2, then M3, and then M4.

In the illustrated examples, the values may be stored in sequential order, and the best or lead value for a given queue may be readily retrievable by and/or accessible to the disclosed system. Thus, in one embodiment, the value having the best priority may be illustrated as being in the topmost position in a queue, although the system may be configured to place the best priority message in some other predetermined position. In the example of FIG. 3A, Value 1 is shown as being the best value or lead value, or the top of the book value, for an example Action.

Figure 3B:
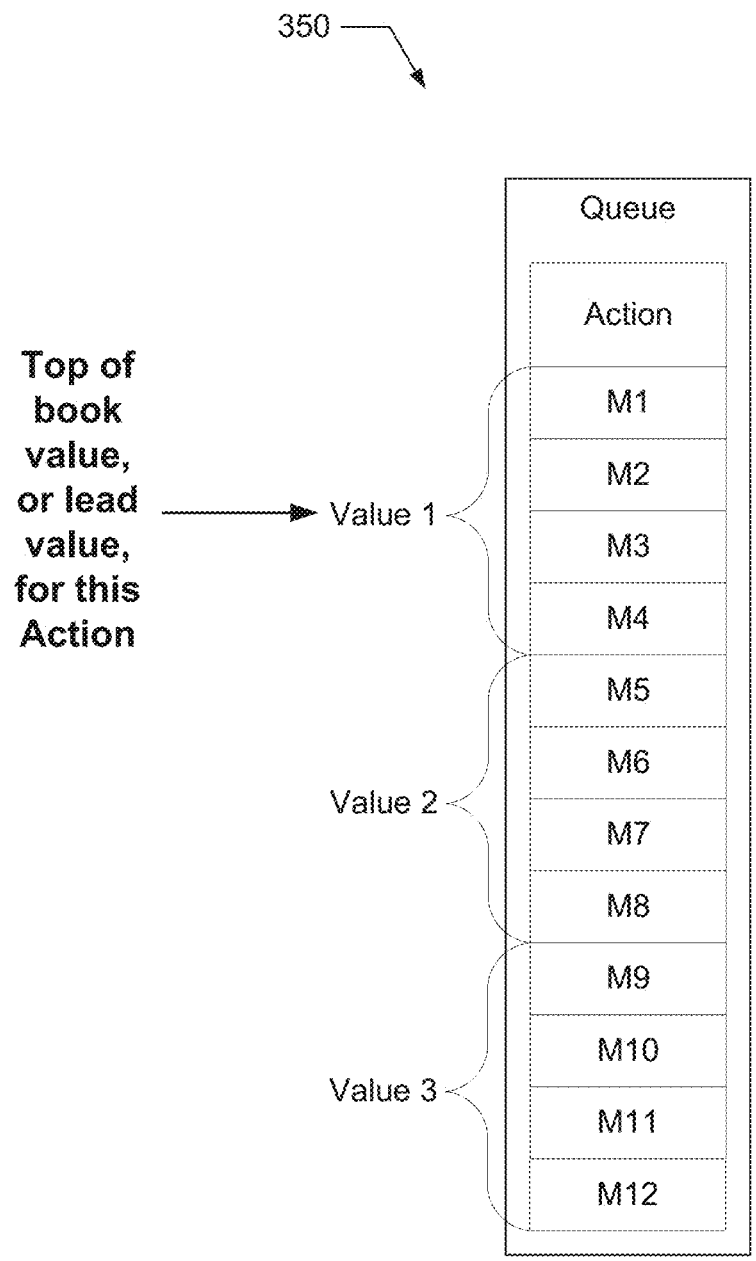
FIG. 3B depicts an illustrative embodiment of an alternative data structure used to implement aspects of the disclosed embodiments.

FIG. 3B illustrates an example alternative data structure 350 for storing and retrieving messages and related values. It should be appreciated that matches occur based on values, and so all the messages related to a given value may be prioritized over all other messages related to a different value. As shown in FIG. 3B, the messages may be stored in one queue and grouped by values according to the hierarchy of the values. The hierarchy of the values may depend on the action to be performed.

For example, if a queue is a sell queue (e.g., the Action is Sell), the lowest value may be given the best priority and the highest value may be given the lowest priority. Thus, as shown in FIG. 3B, if Value 1 is lower than Value 2 which is lower than Value 3, Value 1 messages may be prioritized over Value 2, which in turn may be prioritized over Value 3.

Within Value 1, M1 is prioritized over M2, which in turn is prioritized over M3, which in turn is prioritized over M4. Within Value 2, M5 is prioritized over M6, which in turn is prioritized over M7, which in turn is prioritized over M8. Within Value 3, M9 is prioritized over M10, which in turn is prioritized over M11, which in turn is prioritized over M12.

Alternatively, the messages may be stored in a tree-node data structure that defines the priorities of the messages. In one embodiment, the messages may make up the nodes.

In one embodiment, the system may traverse through a number of different values and associated messages when processing an incoming message. Traversing values may involve the processor loading each value, checking that value and deciding whether to load another value, i.e., by accessing the address pointed at by the address pointer value. In particular, referring to FIG. 3B, if the queue is for selling an object for the listed Values 1, 2 and 3 (where Value 1 is lower than Value 2 which is lower than Value 3), and if the system receives an incoming aggressing order to buy quantity X at a Value 4 that is greater than Values 1, 2, and 3, the system will fill as much of quantity X as possible by first traversing through the messages under Value 1 (in sequence M1, M2, M3, M4). If any of the quantity of X remains, the system traverses down the prioritized queue until all of the incoming order is filled (e.g., all of X is matched) or until all of the quantities of M1 through M12 are filled. Any remaining, unmatched quantity remains on the books, e.g., as a resting order at Value 4, which was the entered value or the message's value.

The system may traverse the queues and check the values in a queue, and upon finding the appropriate value, may locate the messages involved in making that value available to the system. When an outright message value is stored in a queue, and when that outright message is involved in a trade or match, the system may check the queue for the value, and then may check the data structure storing messages associated with that value.

In one embodiment, an exchange computing system may convert all financial instruments to objects. In one embodiment, an object may represent the order book for a financial instrument. Moreover, in one embodiment, an object may be defined by two queues, one queue for each action that can be performed by a user on the object. For example, an order book converted to an object may be represented by an Ask queue and a Bid queue. Resting messages or orders associated with the respective financial instrument may be stored in the appropriate queue and recalled therefrom.

In one embodiment, the messages associated with objects may be stored in specific ways depending on the characteristics of the various messages and the states of the various objects in memory. For example, a system may hold certain resting messages in queue until the message is to be processed, e.g., the message is involved in a match. The order, sequence or priority given to messages may depend on the characteristics of the message. For example, in certain environments, messages may indicate an action that a computer in the system should perform. Actions may be complementary actions, or require more than one message to complete. For example, a system may be tasked with matching messages or actions contained within messages. The messages that are not matched may be queued by the system in a data queue or other structure, e.g., a data tree having nodes representing messages or orders.

The queues are structured so that the messages are stored in sequence according to priority. Although the embodiments are disclosed as being implemented in queues, it should be understood that different data structures such as for example linked lists or trees may also be used.

The system may include separate data structures, e.g., queues, for different actions associated with different objects within the system. For example, in one embodiment, the system may include a queue for each possible action that can be performed on an object. The action may be associated with a value. The system prioritizes the actions based in part on the associated value.

Figure 3C:
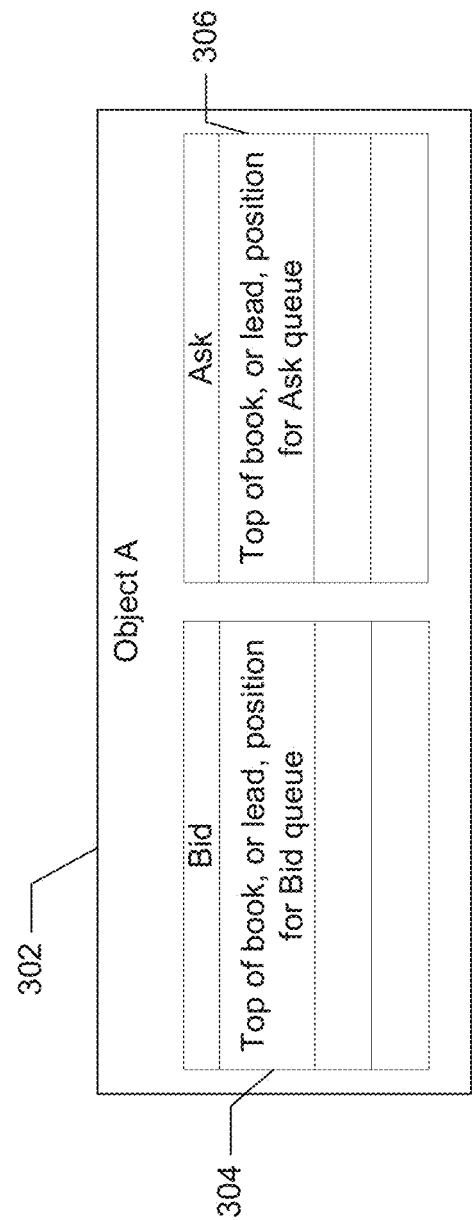
FIG. 3C depicts an illustrative embodiment of an order book data structure used to implement aspects of the disclosed embodiments.

For example, as shown in FIG. 3C, the order book module of a computing system may include several paired queues, such as queues Bid and Ask for an object 302 (e.g., Object A). The system may include two queues, or one pair of queues, for each object that is matched or processed by the system. In one embodiment, the system stores messages in the queues that have not yet been matched or processed. FIG. 3C may be an implementation of the data structures disclosed in FIGS. 3A and/or 3B. Each queue may have a top of book, or lead, position, such as positions 304 and 306, which stores data that is retrievable.

The queues may define the priority or sequence in which messages are processed upon a match event. For example, two messages stored in a queue may represent performing the same action at the same value. When a third message is received by the system that represents a matching action at the same value, the system may need to select one of the two waiting, or resting, messages as the message to use for a match. Thus, when multiple messages can be matched at the same value, the exchange may have a choice or some flexibility regarding the message that is matched. The queues may define the priority in which orders that are otherwise equivalent (e.g., same action for the same object at the same value) are processed.

The system may include a pair of queues for each object, e.g., a bid and ask queue for each object. Each queue may be for example implemented utilizing the data structure of FIG. 3B. The exchange may be able to specify the conditions upon which a message for an object should be placed in a queue. For example, the system may include one queue for each possible action that can be performed on an object. The system may be configured to process messages that match with each other. In one embodiment, a message that indicates performing an action at a value may match with a message indicating performing a corresponding action at the same value. Or, the system may determine the existence of a match when messages for the same value exist in both queues of the same object.

The messages may be received from the same or different users or traders.

The queues illustrated in FIG. 3C hold or store messages received by a computing exchange, e.g., messages submitted by a user to the computing exchange, and waiting for a proper match. It should be appreciated that the queues may also hold or store implieds, e.g., implied messages generated by the exchange system, such as messages implied in or implied out as described herein. The system thus adds messages to the queues as they are received, e.g., messages submitted by users, or generated, e.g., implied messages generated by the exchanges. The sequence or prioritization of messages in the queues is based on information about the messages and the overall state of the various objects in the system.

When the data transaction processing system is implemented as an exchange computing system, as discussed above, different client computers submit electronic data transaction request messages to the exchange computing system. Electronic data transaction request messages include requests to perform a transaction on a data object at a value for a quantity. The exchange computing system includes a transaction processor, e.g., a hardware matching processor or match engine, that matches, or attempts to match, pairs of messages with each other. For example, messages may match if they contain counter instructions (e.g., one message includes instructions to buy, the other message includes instructions to sell) for the same product at the same value. In some cases, depending on the nature of the message, the value at which a match occurs may be the submitted value or a better value. A better value may mean higher or lower value depending on the specific transaction requested. For example, a buy order may match at the submitted buy value or a lower (e.g., better) value. A sell order may match at the submitted sell value or a higher (e.g., better) value.

Transaction Processor Data Structures

Match engine module 106 may include a conversion component (not shown), pre-match queue (not shown), match component (not shown), post-match queue not shown) and publish component knot shown).

Although the embodiments are disclosed as being implemented in queues, it should be understood that different data structures, such as for example linked lists or trees, may also be used. Although the application contemplates using queue data structures for storing messages in a memory, the implementation may involve additional pointers, i.e., memory address pointers, or linking to other data structures. Thus, in one embodiment, each incoming message may be stored at an identifiable memory address. The transaction processing components can traverse messages in order by pointing to and retrieving different messages from the different memories. Thus, messages that may be processed sequentially in queues may actually be stored in memory in disparate locations. The software programs implementing the transaction processing may retrieve and process messages in sequence from the various disparate (e.g., random) locations.

The queues described herein may, in one embodiment, be structured so that the messages are stored in sequence according to time of receipt, e.g., they may be first in first out (FIFO) queues.

The match engine module 106 may be an example of a transaction processing system. The pre-match queue may be an example of a pre-transaction queue. The match component may be an example of a transaction component. The post-match queue 408 may be an example of a post-transaction queue. The publish component may be an example of a distribution component. The transaction component may process messages and generate transaction component results.

In one embodiment, the publish component may be a distribution component that can distribute data to one or more market participant computers. In one embodiment, match engine module 106 operates according to a first in, first out (FIFO) ordering. The conversion component 402 converts or extracts a message received from a trader via the Market Segment Gateway or MSG into a message format that can be input into the pre-match queue.

Messages from the pre-match queue may enter the match component sequentially and may be processed sequentially. In one regard, the pre-transaction queue, e.g., the pre-match queue, may be considered to be a buffer or waiting spot for messages before they can enter and be processed by the transaction component, e.g., the match component. The match component matches orders, and the time a message spends being processed by the match component can vary, depending on the contents of the message and resting orders on the book. Thus, newly received messages wait in the pre-transaction queue until the match component is ready to process those messages. Moreover, messages are received and processed sequentially or in a first-in, first-out FIFO methodology. The first message that enters the pre-match or pre-transaction queue will be the first message to exit the pre-match queue and enter the match component. In one embodiment, there is no out-of-order message processing for messages received by the transaction processing system. The pre-match and post-match queues are, in one embodiment, fixed in size, and any messages received when the queues are full may need to wait outside the transaction processing system or be re-sent to the transaction processing system.

The match component processes an order or message, at which point the transaction processing system may consider the order or message as having been processed. The match component may generate one message or more than one message, depending on whether an incoming order was successfully matched by the match component. An order message that matches against a resting order in the order book may generate dozens or hundreds of messages. For example, a large incoming order may match against several smaller resting orders at the same price level. For example, if many orders match due to a new order message, the match engine needs to send out multiple messages informing traders which resting orders have matched. Or, an order message may not match any resting order and only generate an acknowledgement message. Thus, the match component 406 in one embodiment will generate at least one message, but may generate more messages, depending upon the activities occurring in the match component. For example, the more orders that are matched due to a given message being processed by the match component, the more time may be needed to process that message. Other messages behind that given message will have to wait in the pre-match queue.

Messages resulting from matches in the match component enter the post-match queue. The post-match queue may be similar in functionality and structure to the pre-match queue discussed above, e.g., the post-match queue is a FIFO queue of fixed size. A difference between the pre- and post-match queues may be the location and contents of the structures, namely, the pre-match queue stores messages that are waiting to be processed, whereas the post-match queue stores match component results due to matching by the match component. The match component receives messages from the pre-match queue, and sends match component results to the post-match queue. In one embodiment, the time that results messages, generated due to the transaction processing of a given message, spend in the post-match queue is not included in the latency calculation for the given message.

Messages from the post-match queue enter the publish component sequentially and are published via the MSG sequentially. Thus, the messages in the post-match queue are an effect or result of the messages that were previously in the pre-match queue. In other words, messages that are in the pre-match queue at any given time will have an impact on or affect the contents of the post-match queue, depending on the events that occur in the match component once the messages in the pre-match queue enter the match component.

As noted above, the match engine module 106 in one embodiment operates in a first in first out (FIFO) scheme. In other words, the first message that enters the match engine module 106 is the first message that is processed by the match engine module 106. Thus, the match engine module 106 in one embodiment processes messages in the order the messages are received. Data is processed sequentially by the described structures from left to right, beginning at the conversion component, to the pre-match queue, to the match component, to the post-match queue, and to the publish component. The overall transaction processing system operates in a FIFO scheme such that data flows from element to, in that order. If any one of the queues or components of the transaction processing system experiences a delay, that creates a backlog for the structures preceding the delayed structure. For example, if the match or transaction component is undergoing a high processing volume, and if the pre-match or pre-transaction queue is full of messages waiting to enter the match or transaction component, the conversion component may not be able to add any more messages to the pre-match or pre-transaction queue.

Messages wait in the pre-match queue. The time a message waits in the pre-match queue depends upon how many messages are ahead of that message (i.e., earlier messages), and how much time each of the earlier messages spends being serviced or processed by the match component. Messages also wait in the post-match queue. The time a message waits in the post-match queue depends upon how many messages are ahead of that message (i.e., earlier messages), and how much time each of the earlier messages spends being serviced or processed by the publish component. These wait times may be viewed as a latency that can affect a market participant's trading strategy.

After a message is published (after being processed by the components and/or queues of the match engine module), e.g., via a market data feed, the message becomes public information and is publically viewable and accessible. Traders consuming such published messages may act upon those message, e.g., submit additional new input messages to the exchange computing system responsive to the published messages.

The match component attempts to match aggressing or incoming orders against resting orders. If an aggressing order does not match any resting orders, then the aggressing order may become a resting order, or an order resting on the books. For example, if a message includes a new order that is specified to have a one-year time in force, and the new order does not match any existing resting order, the new order will essentially become a resting order to be matched (or attempted to be matched) with some future aggressing order. The new order will then remain on the books for one year. On the other hand, a new order specified as a fill or kill (e.g., if the order cannot be filled or matched with an order currently resting on the books, the order should be canceled) will never become a resting order, because it will either be filled or matched with a currently resting order, or it will be canceled. The amount of time needed to process or service a message once that message has entered the match component may be referred to as a service time. The service time for a message may depend on the state of the order books when the message enters the match component, as well as the contents, e.g., orders, that are in the message.

In one embodiment, orders in a message are considered to be "locked in", or processed, or committed, upon reaching and entering the match component. If the terms of the aggressing order match a resting order when the aggressing order enters the match component, then the aggressing order will be in one embodiment guaranteed to match.

As noted above, the latency experienced by a message, or the amount of time a message spends waiting to enter the match component, depends upon how many messages are ahead of that message (i.e., earlier messages), and how much time each of the earlier messages spends being serviced or processed by the match component. The amount of time a match component spends processing, matching or attempting to match a message depends upon the type of message, or the characteristics of the message. The time spent inside the processor may be considered to be a service time, e.g., the amount of time a message spends being processed or serviced by the processor.

The number of matches or fills that may be generated in response to a new order message for a financial instrument will depend on the state of the data object representing the electronic marketplace for the financial instrument. The state of the match engine can change based on the contents of incoming messages.

It should be appreciated that the match engine's overall latency is in part a result of the match engine processing the messages it receives. The match component's service time may be a function of the message type (e.g., new, modify, cancel), message arrival rate (e.g., how many orders or messages is the match engine module receiving, e.g., messages per second), message arrival time (e.g., the time a message hits the inbound MSG or market segment gateway), number of fills generated (e.g., how many fills were generated due to a given message, or how many orders matched due to an aggressing or received order), or number of Mass Quote entries (e.g., how many of the entries request a mass quote).

In one embodiment, the time a message spends:

Being converted in the conversion component may be referred to as a conversion time;

Waiting in the pre-match queue may be referred to as a wait until match time;

Being processed or serviced in the match component may be referred to as a matching time;

Waiting in the post-match queue may be referred to as a wait until publish time; and Being processed or published via the publish component may be referred to as a publishing time.

It should be appreciated that the latency may be calculated, in one embodiment, as the sum of the conversion time and wait until match time. Or, the system may calculate latency as the sum of the conversion time, wait until match time, matching time, wait until publish time, and publishing time. In systems where some or all of those times are negligible, or consistent, a measured latency may only include the sum of some of those times. Or, a system may be designed to only calculate one of the times that is the most variable, or that dominates (e.g., percentage wise) the overall latency. For example, some market participants may only care about how long a newly sent message that is added to the end of the pre-match queue will spend waiting in the pre-match queue. Other market participants may care about how long that market participant will have to wait to receive an acknowledgement from the match engine that a message has entered the match component. Yet other market participants may care about how much time will pass from when a message is sent to the match engine's conversion component to when match component results exit or egress from the publish component.

As described herein, users, e.g., traders, may submit electronic data transaction request messages to implement a strategy, and may periodically and frequently update, modify or cancel previously submitted electronic data transaction request messages depending on market conditions, changes in the trading environment, or change in strategy. Or, a target financial instrument being traded may depend on one or more underlying financial instruments, and the trader may modify his or her strategy for the target financial instrument as prices/values for an underlying financial instrument changes. Each message submitted to the data transaction processing system increases the network utilization and traffic congestion between client computers and the data transaction processing system.

A trader may submit, from a client computer, a discrete-value-based electronic data transaction request message that identifies the instrument to trade, the transaction type (buy or sell), the desired quantity, the strike price, maturity, and the premium/value at which the transaction is desired. The electronic data transaction request message may also specify other aspects of orders described herein, e.g., time-in-force (fill immediately, good till cancel, good for the day), or order type (limit, stop), etc.

For example, the 78 Dec option for crude oil and the 79 Dec option for crude oil are both based on the same underlying, namely, a crude oil futures contract. However, the two options are different financial instruments with their own order books that move and trade independently of each other. The 78 Dec option for crude oil and 79 Dec option for crude oil are different financial instruments listed separately by the exchange computing system. Many exchange computing systems treat derivatives as a series of discrete financial instruments to be traded, even if the products typically trade as part of a group or are otherwise interrelated. Thus, a trader who wishes to purchase both the 78 Dec option for crude oil and 79 Dec option for crude oil in a discrete-value-based system would need to submit two different discrete-value-based electronic data transaction request messages.

In many cases, a trader's strategies may be based on combinations of different prices, such as spread orders, or options that optimize price differences between premiums and strikes. In these trades, the absolute value of the trade price of the underlying may be less important than the difference of the trade price from some other reference price. If a trader's strategy encompasses transacting on an underlying instrument at different strike prices, the trader's client computer submits multiple different discrete-value-based electronic data transaction request messages for different financial instruments. In other words, each different strike price and each different maturity is listed as a separate financial instrument. If a trader wishes to transact on an underlying financial instrument at different strike prices and different maturities, the trader submits a separate message for each different strike price and each different maturity.

For example, buying a 78 Dec call option for crude oil at 2 means that a trader buys, for $2 (premium), an option to buy a crude oil contract for strike price $78 which matures in December. Buying a 79 Dec call option for crude oil at 1 means that a trader buys, for $1 (premium), an option to buy a crude oil contract for strike price $79 which matures in December. From the trader's perspective, buying a 78 Dec call option for crude oil at 2 or buying a 79 Dec call option for crude oil at 1 may be functionally equal, because they represent the same overall cost to the trader (i.e., 78+2=79+1). The trader may submit two different discrete-value-based electronic data transaction request messages, one for buying a 78 Dec call option for crude oil at discrete value 2, and another for buying a 79 Dec call option for crude oil at discrete value 1, because both satisfy the trader's desire, which may be part of an overall trading strategy, to commit or allocate $80 to a Dec call option for crude oil, even though the trader may not specifically prefer that one electronic data transaction request message is executed or performed over the other.

Customers such as market makers may place hundreds to thousands of orders with the exchange computing system covering multiple strikes for an instrument. These orders are generated by the customer, using data models which are based on market data, and transmitted to the exchange quoting premiums. When the market changes, some or all of these orders may need to be recalculated and updated, typically all at once or in as little time as possible, by, for example, sending in order modifications or cancellations to the exchange. The flood of information is taxing on the exchange hardware and also on customer's equipment as it may involve thousands to millions of message per second back and forth throughout a day.

As discussed herein, a trader's trading strategy typically involves multiple discrete-value-based electronic data transaction request messages, each defining different combinations of premiums, strike prices and maturities. If a trader is interested in transacting on different strike prices, different maturities, or different strike prices at different maturities, the trader submits multiple discrete-value-based messages, where each message relates to a single strike price, or to a single maturity. The disclosed embodiments allow traders to submit equation-based electronic data transaction request messages that include information about multiple combinations of premium prices, strike prices, and maturities. One equation-based electronic data transaction request message includes an equation that defines a relationship between a range of different premiums, strike prices and maturities. A trader that submits an equation-based electronic data transaction request message no longer needs to send multiple discrete-value-based electronic data transaction request messages, each specifying a combination of premium (price or value), strike price, and/or maturity.

In one embodiment, the exchange computing system may list, or make available for trading, equation-based financial instruments. An equation-based financial instrument may be a contract that is based on an underlying contract or financial instrument. In one embodiment, an equation-based financial instrument does not specify one strike price or maturity. The strike price and maturity are instead variables, and the trader may specify, in an equation-based electronic data transaction request message, how the premium price he/she is willing to pay varies with strike price and maturity. For example, an equation submitted by the trader (e.g., via an equation-based electronic data transaction request message) defines the premium that the trader is willing to pay to transact on (e.g., buy or sell) the underlying financial instrument for a set, or over a range, of strike prices, or over a set, or over a range, of maturities, or both.

In an embodiment, an equation-based financial instrument may fix a strike price, or alternatively may fix a maturity. The equation-based electronic data transaction request message would then specify an equation that defines how the premium value (i.e., what the trader is willing to pay if all the parameters of the electronic data transaction request message are met) varies with the non-fixed variable.

For example, the exchange computing system may offer an equation-based financial instrument for the May expiry for crude oil. Thus, the maturity date is fixed in the contract, e.g., May. Thus, the equation submitted by the trader for such a financial instrument may only vary with strike price. In other words, the equation defines the trader's premium prices against different strike prices (e.g., different parameters) for a May expiry (e.g., fixed parameter). In one embodiment, as more parameters are fixed by the equation-based financial instrument, the complexity of the equation necessary to the transact that equation-based financial instrument is reduced. Conversely, if an equation-based financial instrument does not fix any of the parameters, the traders may need to submit more complex multi-variable equations.

In one embodiment, an equation-based data transaction processing system receives, and/or matches, electronic data transaction request messages that include equations defining a wide range of desired combinations of financial instruments specifying different premiums, strike prices and maturities.

An equation-based electronic data transaction request message for an options contract may include the identifier of the underlying futures contract, instead of the identifier for the desired options contract (e.g., the identifier specifies "crude oil", instead of specifying "78 Dec crude oil"). The equation-based electronic data transaction request message may also include a quantity, transaction type (buy or sell), order type, time-in-force, an equation, and other variables for the equation. An equation in an equation-based electronic data transaction request message is used to determine prices (premiums) across varying strike prices and/or varying maturities at which the trader would like to perform the requested transaction.

In one embodiment, the equation-based electronic data transaction request message may also include a beginning and an end of the range, or boundaries, over which the trader desires to trade the financial instrument. If the trader does not include a beginning and end range, the exchange computing system may use default boundaries with which to support equation-based messaging and trading. For example, the exchange computing system may support equation-based trading for a financial instrument over a bounded range where the maturity ranges over twelve months, and the strike price ranges to plus and minus 10 ticks around the current trade price. If a trader submits an equation-based electronic data transaction request message without defining a beginning and end range for the strike price and maturity, the exchange computing system may only evaluate the electronic data transaction request message over the 12 month, 20 tick bounded range. For a two-dimensional equation defining a relationship or pricing curve between premium price (e.g., y-axis) and strike price (e.g., x-axis), the exchange computing system may limit the range of x and y values that will be considered. A trader may further limit the range of parameters for the variables that will be considered, so that the trader can limit the size of the evaluation range associated with an electronic data transaction request message.

The equation may specify that the premium is determined based on a known pricing equation, such as Black-Sholes. As is known in the art, the Black Scholes model, also known as the Black-Scholes-Merton model, is a model of price variation over time of financial instruments that can, among other things, be used to determine the price of a European call option. The equation may define any other common pricing equation, now available or later developed, such as Black; Merton; Adesi-Whaley; Whaley-Scholes; Whaley-Black; Cox-Ross-Rubinstein for American options; Cox-Ross-Rubinstein for European options; or Intrinsic Value pricing equation. The equation in an equation-based electronic data transaction request message may be based on any pricing model that the trader wants to use and implement.

Figure 4:
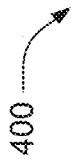
FIG. 4 illustrates an example equation-based electronic data transaction request message in accordance with the disclosed embodiments.

FIG. 4 illustrates an example equation-based electronic data transaction request message 400. Message 400 includes an order type field 402, a transaction type field 404, an equation field 406, a volatility field 408, an interest rate field 410, a quantity field 412, a firmID field 414, and an underlying instrument field 416. The trader, using his or her client computer, enters information for each of the fields. As shown in FIG. 4, message 400's equation field 406 specifies that the message is requesting pricing based on the Black-Sholes equation.

In one embodiment, an equation-based electronic data transaction request message may specify a relationship between multiple variables. The variables may be premium price, strike price, interest rate, etc. For example, the premium price may vary as different parameters are used for strike price and interest rate.

When each desired strike price and each desired maturity is a separate financial instrument, each strike price and maturity is associated with its own different order book object (which stores, among other information, resting values for buying or selling the particular financial instrument). When each desired strike price and each desired maturity is a separate financial instrument, traders may typically submit separate discrete-value-based electronic data transaction request messages, each message relating to a separate financial instrument. However, implementing the disclosed embodiments allows traders to submit equation-based messages, where an equation defines desired premiums over a set of strike prices and/or maturities. Thus, a trader can submit just one electronic data transaction request message that contains data or information relating to multiple financial instruments.

The electronic data transaction request message may also specify a predicted volatility (e.g., 0.0001 to 0.9999) of the underlying financial instrument. The electronic data transaction request message may include an interest rate, if the equation relies on the interest rate as a variable. Or, the electronic data transaction request message may not include an interest rate in the interest rate field, in which case the exchange computing system can use the current interest rate as known to the exchange computing system, e.g., obtained from a defined reference source. The electronic data transaction request message may also include values for custom variables used in the specified equation.

The electronic data transaction request message may also include time to expiry, or maturity, for the option. However, in one embodiment, as discussed above, the exchange computing system offers an equation-based financial instrument where the maturity date is already fixed or specified, and thus cannot be changed.

The exchange computing system may be able to independently determine values for certain fields even if the electronic data transaction request message does not specify such fields. For example, in one embodiment, the maturity date may be defined by, or based on, the product contract. Thus, the product may be associated with a fixed maturity date, so the maturity date does not need to be in the equation-based electronic data transaction request message. Similarly, the exchange computing system can access the latest price of the underlying by using its own books, or by subscribing to a market data feed from another exchange. Accordingly, the underlying price may be included, but is not required, in the electronic data transaction request message.

It may nevertheless be necessary for the trader to include some of the information that is not readily known or available to the exchange computing system. For example, the electronic data transaction request message's equation may include a variable for a measure of public sentiment, which may be listed on a social media website. This information may not be readily available to the exchange computing system, and should therefore be supplied by the trader submitting the message.

The electronic data transaction request message also includes other information that is typically included in orders, such as order type (e.g., limit or stop), quantity, transaction type (e.g., bid or offer), firm/account/trader identifiers, order identifiers, and desired protections, such as self-match prevention.

In many cases, traders may use mathematical models to determine the prices at which they will offer to buy and sell options. The trader may generate a custom equation, which may be based on the trader's mathematical model, and submit the custom equation in the equation-based electronic data transaction request message. In one embodiment, the equation submitted by the trader reflects the trader's belief about how markets will behave.

Figure 5:
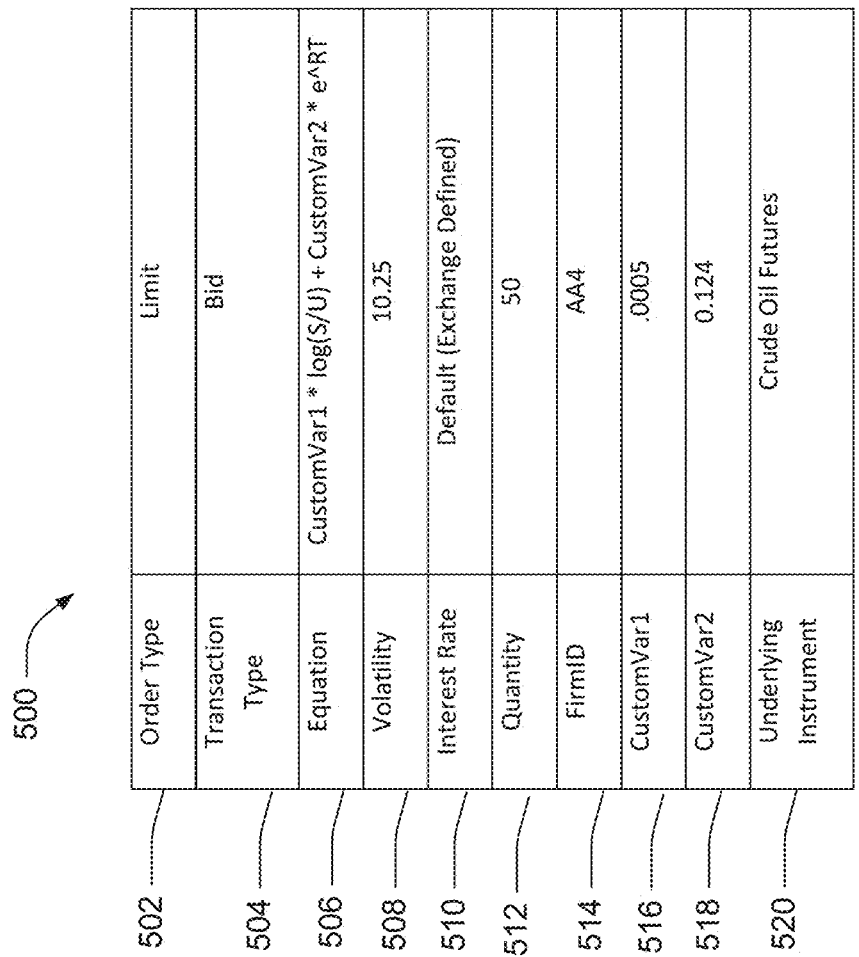
FIG. 5 illustrates another example equation-based electronic data transaction request message in accordance with the disclosed embodiments.

FIG. 5 illustrates another example equation-based electronic data transaction request message 500. Message 500 includes an order type field 502, a transaction type field 504, an equation field 506, a volatility field 508, an interest rate field 510, a quantity field 512, a firmID field 514, custom variable fields 516 and 518, and an underlying instrument field 520. The trader, using his or her client computer, enters information for each of the fields. As shown in FIG. 5, message 500's equation field 506 specifies that the message is requesting pricing based on a custom equation $CustomVar1*\log(S/U)+CustomVar2*e^{RT}$, where S represents the strike price and U represents the underlying price, e represents the mathematical constant that is the base of the natural logarithm (approximately 2.718), R is the interest rate, and T is the time remaining until the option expires (i.e., maturity date). The equation in equation-based electronic data transaction request message 500 specifies that the trader is interested in a price that is a function of the ratio of the strike price to the underlying price.

The electronic data transaction request message may include a range defining the premiums at which different strike prices and/or maturities should be transacted.

A trader may re-use certain custom equations multiple times. Accordingly, in one embodiment, the data transaction processing system may store a library of custom equations in a table. The trader can refer to the specific desired equation by referring to an equation ID in field 506 of message 500. In some instances, the equation may include variables, such as S, U, V or R, which stand for strike price, underlying price, volatility, and interest rate, respectively. In one embodiment, the exchange computing system may be able to readily retrieve values for these variables, and so it may not be necessary for the client computer to submit values for such variables.

One equation-based electronic data transaction request message may be able to convey information that would normally require multiple discrete-value-based electronic data transaction request messages. For example, one equation-based electronic data transaction request message can represent hundreds of different combinations of premium prices, strike prices, and maturities. Thus, submitting equation-based electronic data transaction request messages can greatly reduce the amount of information that is transmitted to the data transaction processing system.

Another advantage of submitting equation-based electronic data transaction request messages may be a reduction of the effects of transmission disparities between different client computers submitting equation-based electronic data transaction request messages. In particular, as is known message/packet size can have a large impact on the transmission speed of a message. Equation-based electronic data transaction request messages are expected to be the same or similar size, because they may define the same list of fields (e.g., see FIGS. 4 and 5). When different client computers submit messages of nearly the same size, any transmission speed differences from the two client computers to the data transaction processing system may be mollified.

Some customers may not wish to share their strategies, and therefore their pricing equations, with the exchange computing system. Such customers may choose to obfuscate their pricing equations before submitting to the exchange computing system. For example, curve obfuscation can be implemented by passing a pricing curve, associated with a pricing equation, through a Fast-Fourier Transform to create a new, independent curve that is identical to the pricing curve. The original pricing curve (or equation) cannot be derived from the obfuscated curve. If the exchange computing system receives an obfuscated curve, the exchange computing system may not be able to update the equation as underlying conditions change (price movement, interest rate changes, etc.). For example, equation $\sin((2*pi)*50)+\cos(pi/2)+\sin(\frac{1}{2}*pi*1.14)+\cos(3.1*pi^2.28)$ may be an obfuscated equation based on a pricing equation. The customer only needs to share the obfuscated equation, thereby keeping the original pricing equation private and secure on the customer's network.

In one embodiment, the exchange computing system may obfuscate an incoming pricing equation, and thereafter delete the received pricing equation and only use/store the obfuscated equation, so that the exchange computing system does not need to store sensitive customer strategy data.

The equation-based data transaction processing system also reduces the amount of data that is necessary to submit to the exchange computing system to update or modify previously sent electronic data transaction request messages. This may also improve the speed at which changes can be completed by the data transaction processing system. Once a client computer has submitted an equation-based electronic data transaction request message, the submitting trader may be able to modify the equation by simply submitting updates or changes to the submitted equation. Without an equation-based messaging system, a client computer may need to submit hundreds of messages to change a strategy. In an equation-based data transaction processing system, one update message can convey all of the new desired prices, without needing to specifically identify each new desired price. The update message may change how the variables are related to each other, the values of constants in the equation, or may specify parameters for one or more of the variables.

Figure 6:
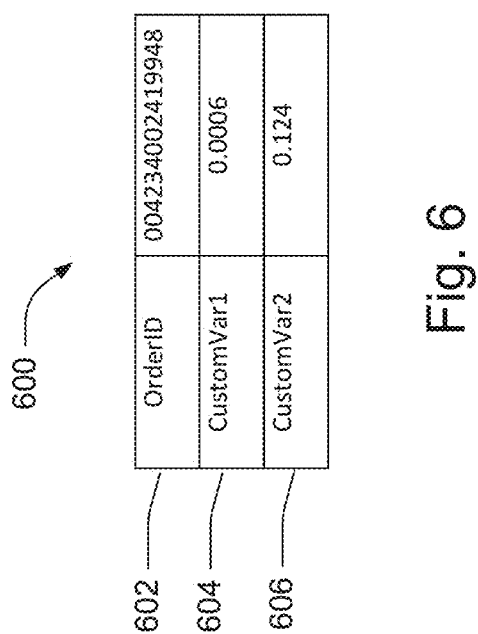
FIG. 6 illustrates an example equation-based electronic data transaction request update message in accordance with the disclosed embodiments.

For example, a trader may submit message 500 to the exchange computing system. Thereafter, the trader's strategy may change, so that the trader desires different values for custom variables CustomVar1 and CustomVar2. The trader may accordingly submit an update message 600, as shown in FIG. 6. The update message may refer to a previously submitted order via orderID field 602, and may update values for custom variables CustomVar1 and CustomVar2 via fields 604 and 606. The exchange computing system changes the equation associated with message 500 upon receiving message 600. Accordingly, the equation-based data transaction processing system can more efficiently update/recalculate changes to a trader's strategy. Instead of having to update all of the customer's desired prices, the data transaction processing system only need change the equation, e.g., by changing how the variables relate to each other, representing the customer's desired strategy.

As discussed above, an options contract is a financial instrument that is based on another financial instrument, such as a futures contract. An options contract specifies a strike price and a maturity for a futures contract. An option provides the options buyer the right, though not the obligation, to take a long or short position in a specific underlying contract at a specific price (i.e., the strike price) on or before the expiration date (i.e., maturity). For this right granted by the option contract, the buyer pays a sum of money or premium (i.e., the premium price) to the option seller. The option seller keeps the premium whether or not the option is exercised by the buyer. The seller fulfills the obligation of the contract if and when the option is exercised by the buyer.

The strike price is the price the options buyer pays for the underlying financial instrument, if the options buyer decides to exercise his/her right. In other words, the strike price is the price at which the options buyer will be allowed to buy the underlying financial instrument.

Several factors may have a significant impact on option premiums, such as volatility of the underlying instrument, the exercise price compared to the underlying instrument's price, and the time remaining until expiration, i.e., the maturity date associated with the option.

When the underlying instrument's prices are rising or falling substantially, its volatility may be said to be high. When an instrument shows little price movement, its volatility may be said to be low. High volatility of an underlying instrument may cause option premiums to increase or decrease very dramatically. Lower volatility environments of an underlying instrument may cause options premiums to increase or decrease at a slower rate.

The relationship between the exercise or strike price of an option compared to the underlying futures price also affects the premium of the option. If NYMEX Crude Oil futures are trading at 98.00 per barrel, a 94.00 call option is worth more than a 96.00 call option (the right to buy $2.00/barrel lower is more expensive). Similarly, a $100.00 call option is relatively cheap because the underlying NYMEX Crude Oil futures is $2.00 points away from the exercise price.

An option's value may diminish as its expiration nears. An option with 60 days until expiration may have greater theoretical value than an option with 30 days until expiration. When there is more time for the underlying futures to move, sellers demand, and buyers are willing to pay, a larger premium.

It should accordingly be appreciated that the premium of an options contract can vary, sometimes dramatically, with the underlying futures contract. As any one of the volatility of the underlying futures, the exercise (or strike) price compared to the underlying futures price, and the time remaining until expiration change, an exchange computing system may recalculate the premiums of an options contract. An exchange computing system listing options contract financial instruments may frequently update options premiums, and transmit these updates via market data feeds.

By specifying an equation based on the underlying financial instrument, the client computer does not need to recalculate and submit new prices each time the underlying financial instrument price or volatility changes. Instead, the transaction processor can just calculate the new price based on the change in the underlying, because the transaction processor has the equation that the submitting trader wishes to use.

Thus, implementing equation-based electronic data transaction request messages reduces the computations needed to be performed by the client computer or the exchange computing system, and reduces the data transmissions from the client computer and the exchange computing system. Thus, the equation-based electronic data transaction request messages may be implemented to compress the data transmitted from the client computers to the data transaction processing system.

A transaction processor that receives discrete-value-based electronic data transaction request messages determines if the best bid price meets or exceeds the best offer price for the target financial instrument, and if so, determines that there is a match and that a trade should be executed. The transaction processor accordingly compares individual buy (or sell) price levels or values against counter sell (or buy) price levels, for each target financial instrument, to determine whether a transaction should occur.

Upon receiving an equation-based electronic data transaction request message, the data transaction processing system may compare the received equation against resting equations for transactions counter to the receiving equation. For example, the data transaction processing system may compare an incoming buy equation against resting sell equations. In one embodiment, the data transaction processing system may determine that a match should occur where an acquire curve (based on the buy equation) intersects and/or overlaps a relinquish curve (based on a resting sell equation).

Figure 7:
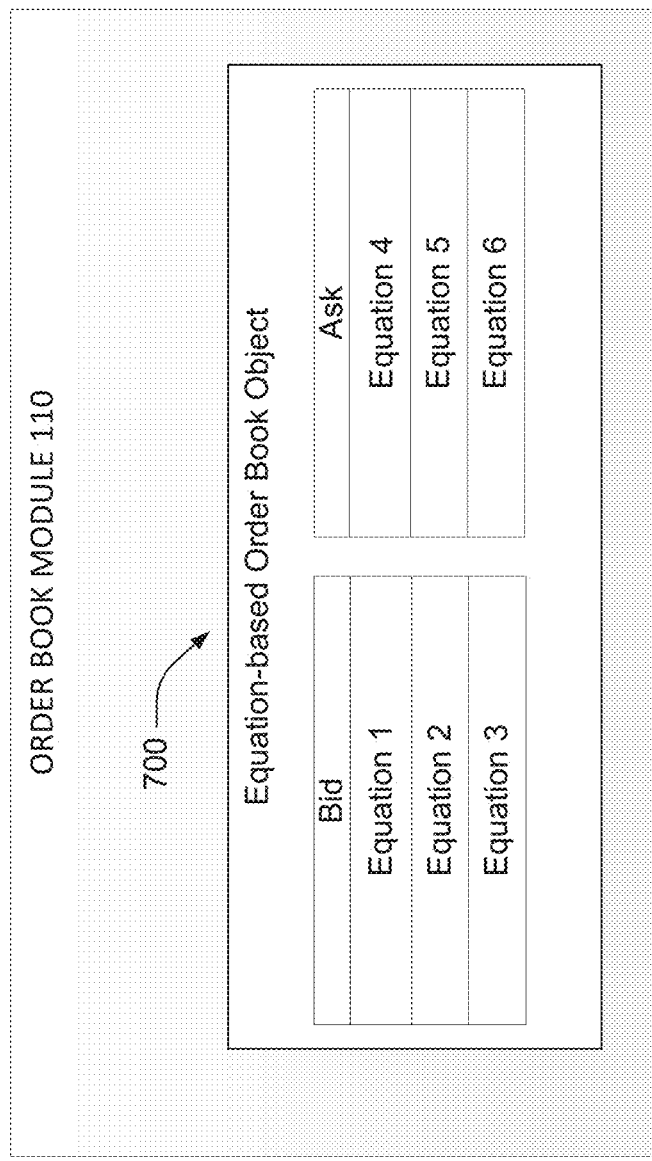
FIG. 7 illustrates an example equation-based order book object in accordance with the disclosed embodiments.

If an incoming equation-based electronic data transaction request message does not match any of the resting equations counter thereto, the data transaction processing system may store the incoming electronic data transaction request message information in an equation-based order book object. The equation-based data transaction processing system may utilize the data structures described herein, e.g., such as FIGS. 3A to 3C, to store information related to the received equation-based electronic data transaction request messages, and to implement an equation-based order book object. For example, FIG. 7 illustrates an example order book module 110 including equation-based order book object 700. Equation-based order book object 700 includes buy equations 1, 2 and 3, and sell equations 4, 5 and 6.

An exchange computing system that receives and matches discrete-value-based messages may store discrete, fixed values in an associated order book object if the messages do not result in a match. An exchange computing system that matches equation-based electronic data transaction request messages includes equation-based order book objects/data structures, like equation-based order book object 700, that store equations associated with equation-based electronic data transaction request messages.

A system configured to perform equation-based matching can quickly and efficiently determine whether two equations intersect within a trading range (e.g., bounded range), and the coordinates where the equations match, without having to perform a coordinate (e.g., premium price and strike price) by coordinate comparison for each premium price/strike price combination submitted by different traders.

Figure 8:
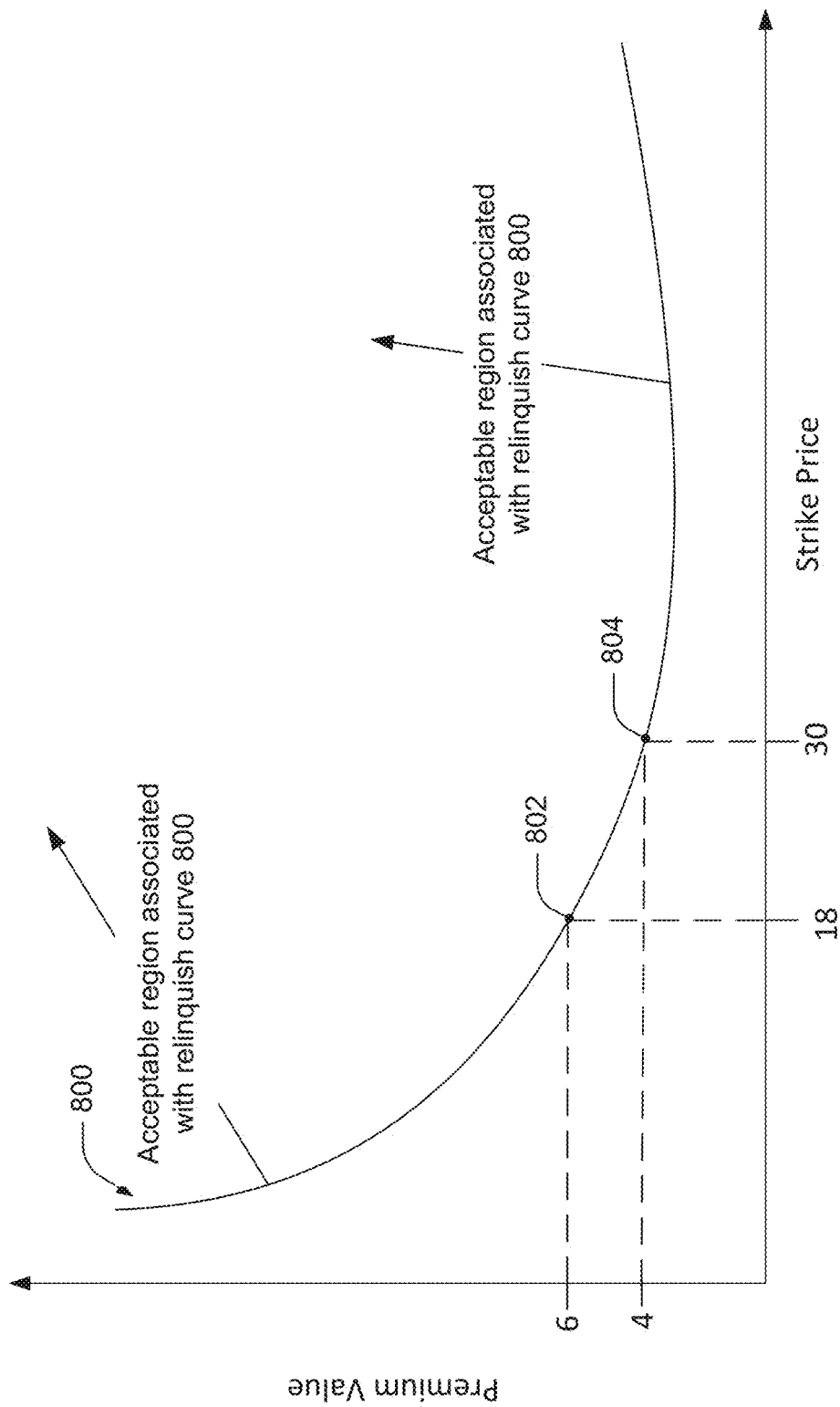
FIG. 8 illustrates an example relinquish curve associated with an equation-based electronic data transaction request message in accordance with the disclosed embodiments.

An equation-based electronic data transaction request message may correspond to a curve that, for exemplary purposes, may be plotted to illustrate a relationship defined by the equation. FIG. 8 illustrates an example relinquish curve 800 associated with an equation-based electronic data transaction request message defining parameters for the y-axis variable, which is the premium price or value at which (or above which, because the requested transaction is to sell or relinquish) the curve submitter (e.g., via a client computer) would like to perform a transaction (e.g., relinquish) at each parameter for the x-axis variable, which is strike price. Each premium/strike price combination defined by the curve represents a point at which the trader is willing to execute a transaction. For example, curve 800 illustrates that the trader is willing to pay a premium of 6 (or greater) for a strike price of 18 (point 802 on curve 800) and a premium of 4 (or greater) for a strike price of 30 (point 804 on curve 800).

The equation-based electronic data transaction request message associated with curve 800 may be received by exchange computing system at time t=t0. If there are no acquire equations resting on the books, i.e., there is no equation to compare with (for matching purposes) the relinquish equation associated with curve 800, the equation associated with curve 800 may rest on the books.

The system may thereafter receive an equation-based electronic data transaction request message. The equation may be plotted on a set of axes for exemplary purposes, resulting in curve 900, illustrated in FIG. 9, at time t=t1.

Figure 9:
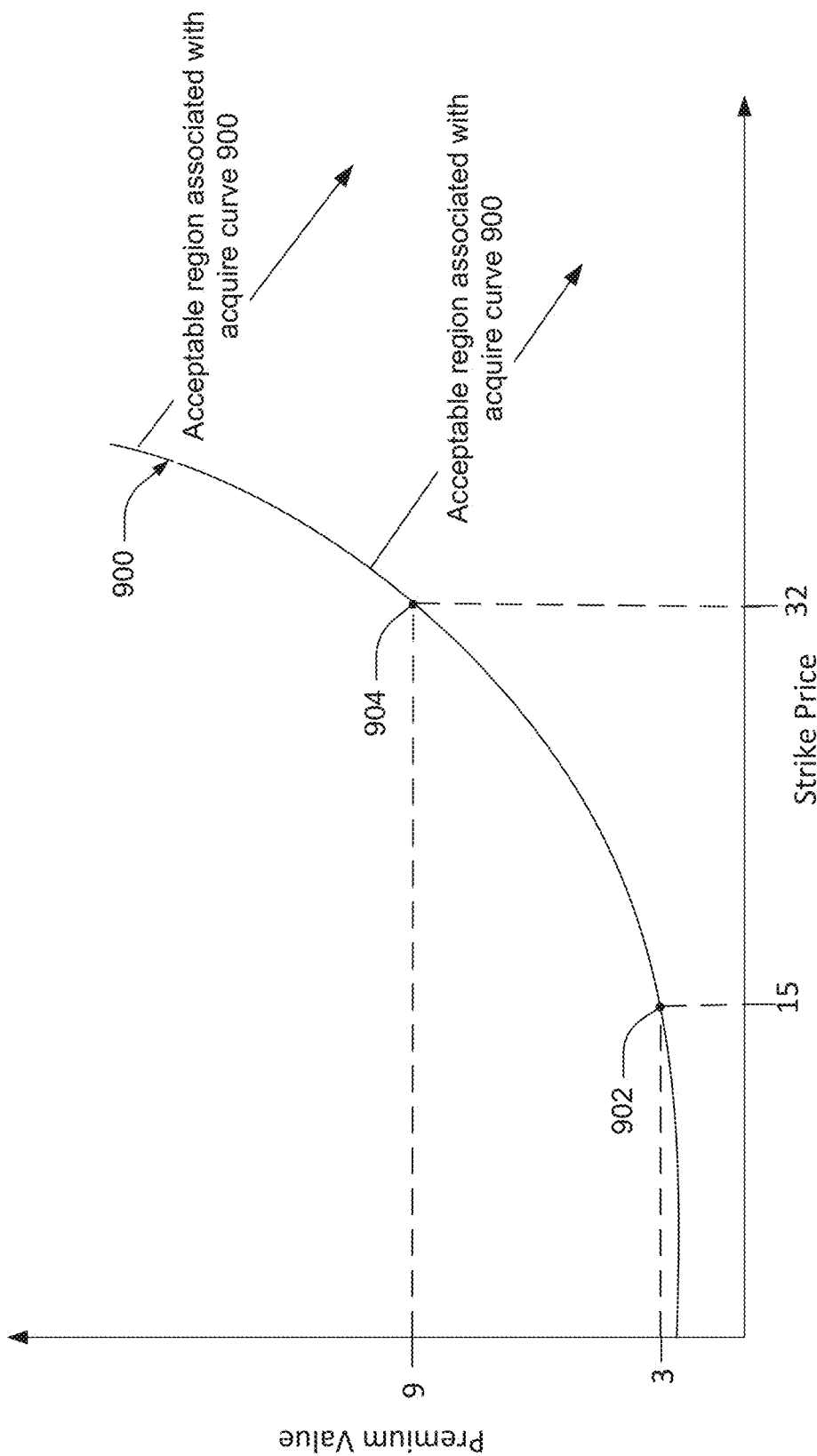
FIG. 9 illustrates an example acquire curve associated with an equation-based electronic data transaction request message in accordance with the disclosed embodiments.

FIG. 9 illustrates example acquire curve 900, associated with another equation-based electronic data transaction request message defining parameters for the y-axis variable, which is the premium price or value at which (or below which, because the requested transaction is to buy or acquire) the curve submitter (e.g., via a client computer) would like to perform a transaction (e.g., acquire) at each parameter for the x-axis variable, which is strike price. Each premium/strike price combination defined by the curve represents a point at which the trader is willing to execute a transaction. For example, curve 900 illustrates that the trader is willing to pay a premium of 3 (or less) for a strike price of 15 (point 902 on curve 900) and a premium of 9 (or less) for a strike price of 32 (point 904 on curve 900).

It should be appreciated that by implementing equation-based electronic data transaction request messages, traders can convey information about multiple different strike prices via one message. Referring back to FIGS. 8 and 9, each strike price on the x-axis may be traded as a separate financial instrument. Discrete-value-based messaging allows traders to specify, or request a transaction on, only one financial instrument per message. Thus, for a trader to have a position on all of the different strike prices associated with curve 800, the trader would submit a plurality of messages. Each message would be associated with a different strike price, where each strike price is listed, managed and traded as a separate financial instrument. For example, as shown in FIG. 8, the trader has a position for a wide range of strike prices, including strike price 18 and strike price 30. The equation-based electronic data transaction request message allows the trader to submit all of the positions associated with curve 800 via one equation-based electronic data transaction request message that defines a relationship for how the premium varies with different strike prices. As noted above, the exchange computing system, or the trader, may limit the bounds of the trading range that is considered by the exchange computing system. For example, the trader may specify that he or she only wishes to trade between strike prices 18 and 30. The exchange computing system then only attempts the match the equation submitted by the trader between strike prices 18 and 30. If the tick size for the financial instrument is one, then the sole equation-based electronic data transaction request message, bounded in a range of 18 to 30 (endpoints included), would allow the trader to have a tradable position over 13 different strike prices. If the trader used discrete-value-based electronic data transaction request messages, the trader would have had to submit 13 different messages. If the trading/bounded range is configured to be, for example, 1,000 strike prices wide, a single equation-based electronic data transaction request message allows a trader to submit up to 1,000 different premium/strike price combinations.

Moreover, the size of the electronic data transaction request message does not become larger as the bounded trading range is varied. An equation-based electronic data transaction request message that encompasses 10,000 different strike price/maturity/premium combinations requires substantially the same amount storage space, transmission bandwidth, and processing resources on client computer and exchange computing system hardware as an equation-based electronic data transaction request message that encompasses 50 different strike price/maturity/premium combinations.

Some exchanges, such as CME, offer mass quoting ability that allows the trader to submit positions for multiple strike prices. However, the size of a mass quote is often limited to a small number of different strike prices. Moreover, mass quote messages are large, and require more storage space and transmission bandwidth than discrete-value-based messages specifying only one value for a single strike price. An equation-based electronic data transaction request message can represent, with one equation, hundreds or even thousands of different combinations of premium values and strike prices and/or maturities.

Figure 10:
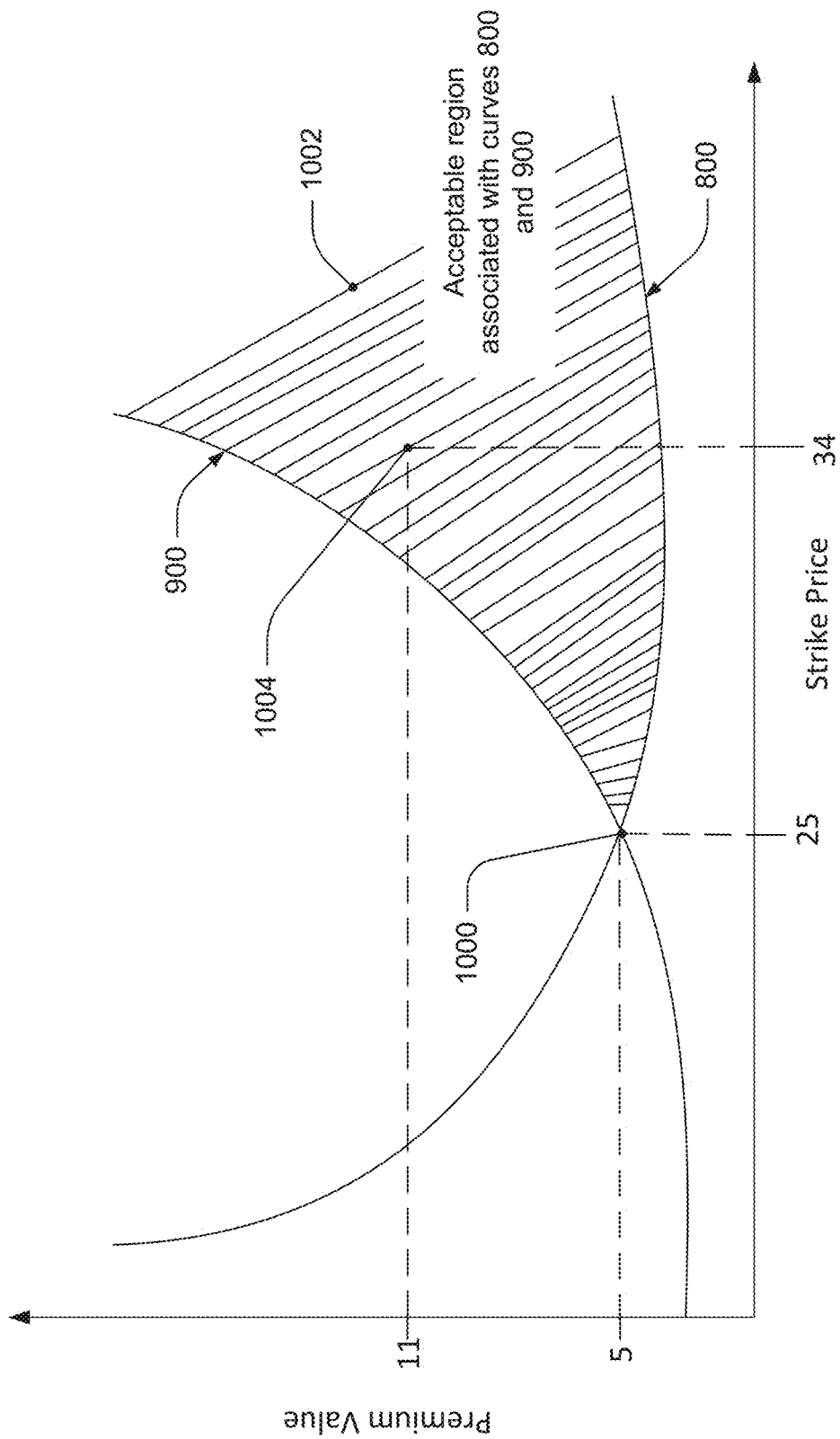
FIG. 10 illustrates multiple equation-based curves in accordance with the disclosed embodiments.

FIG. 10 illustrates curves 800 and 900 plotted on the same axes. As illustrated in FIG. 10, the two curves intersect at point 1000, which defines a premium of 5 for a strike price of 25. Thus, point 1000 represents a combination of premium price and strike price that satisfies the two equations associated with the two curves, and thus represents a value at which both parties (submitter of equation associated with curve 800 and submitter of equation associated with curve 900) agree to perform a transaction. Because the curves define upper (acquire curve) or lower (relinquish) limits, there may be a region that satisfies the two equations associated with the two curves. For instance, shaded region 1002 defines all the points (i.e., combinations of premium prices and strike prices) at which both parties (submitter of equation associated with curve 800 and submitter of equation associated with curve 900) would agree to perform a trade. Thus, the exchange computing system can match the two equations associated with the two curves at any one of the points within and defining the boundaries of shaded region 1002, including point 1000. Again, it should be appreciated that the shaded region 1002 (or the overlapping region) is defined by curve 900 as an upper limit and curve 800 as a lower limit. In equation-based matching, relinquish equations define lower limits of acceptable premium values, and acquire equations define upper limits of acceptable premium values.

Figure 11:
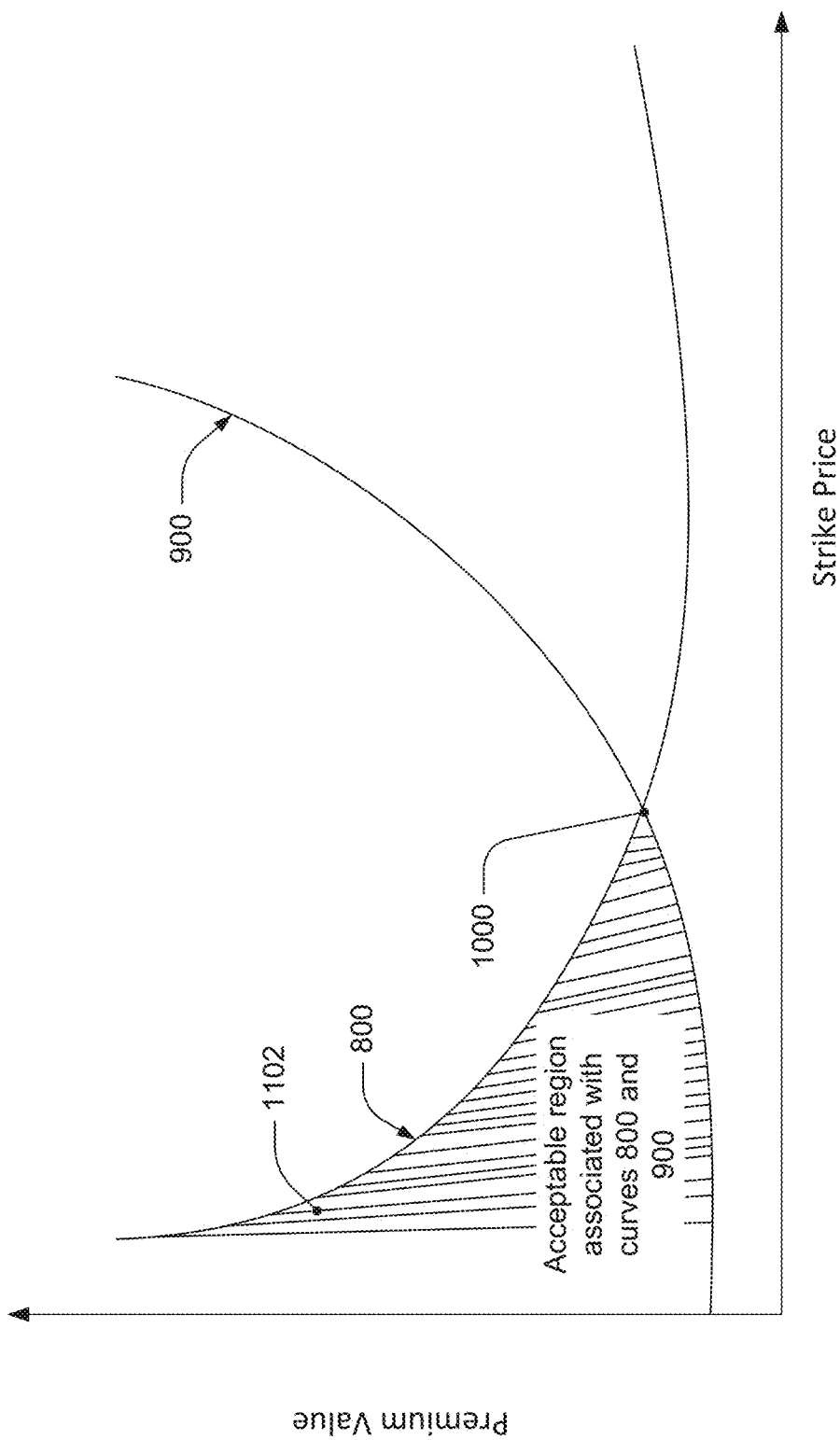
FIG. 11 also illustrates multiple equation-based curves in accordance with the disclosed embodiments.

If, in one embodiment, the curves were modified so that curve 800 was an acquire curve and curve 900 was a relinquish curve, the overlapping region (where a match could occur) would be defined as region 1102 as shown in FIG. 11.

The transaction processor may be configured to select a point at which to execute a transaction for two equations that share a common point (e.g., intersect or overlap) based on a variety of implementation-specific rules. For example, the exchange computing system may match at a point that is the lowest premium price for the aggressing curve. Or, the exchange computing system may match at a point that is the lowest premium price for the resting curve. Because two equations may share many different points/coordinates that would satisfy both equation, the exchange computing system may be configured to determine the point at which a transaction is execute based on priority rules.

In the example of FIGS. 8 and 9, the maturity date is assumed to be fixed. In other words, the traders submit equations that define a relationship between the premium and strike price. In some embodiments, the premium may vary with both strike price and maturity date. Thus, instead of the two-dimensional axes illustrated in FIGS. 8 and 9, the equation may be best illustrated on a three-dimensional axis, such as that shown in FIG. 12. The trader's equation may define a surface of premium values that varies with both strike price and maturity.

Figure 12:
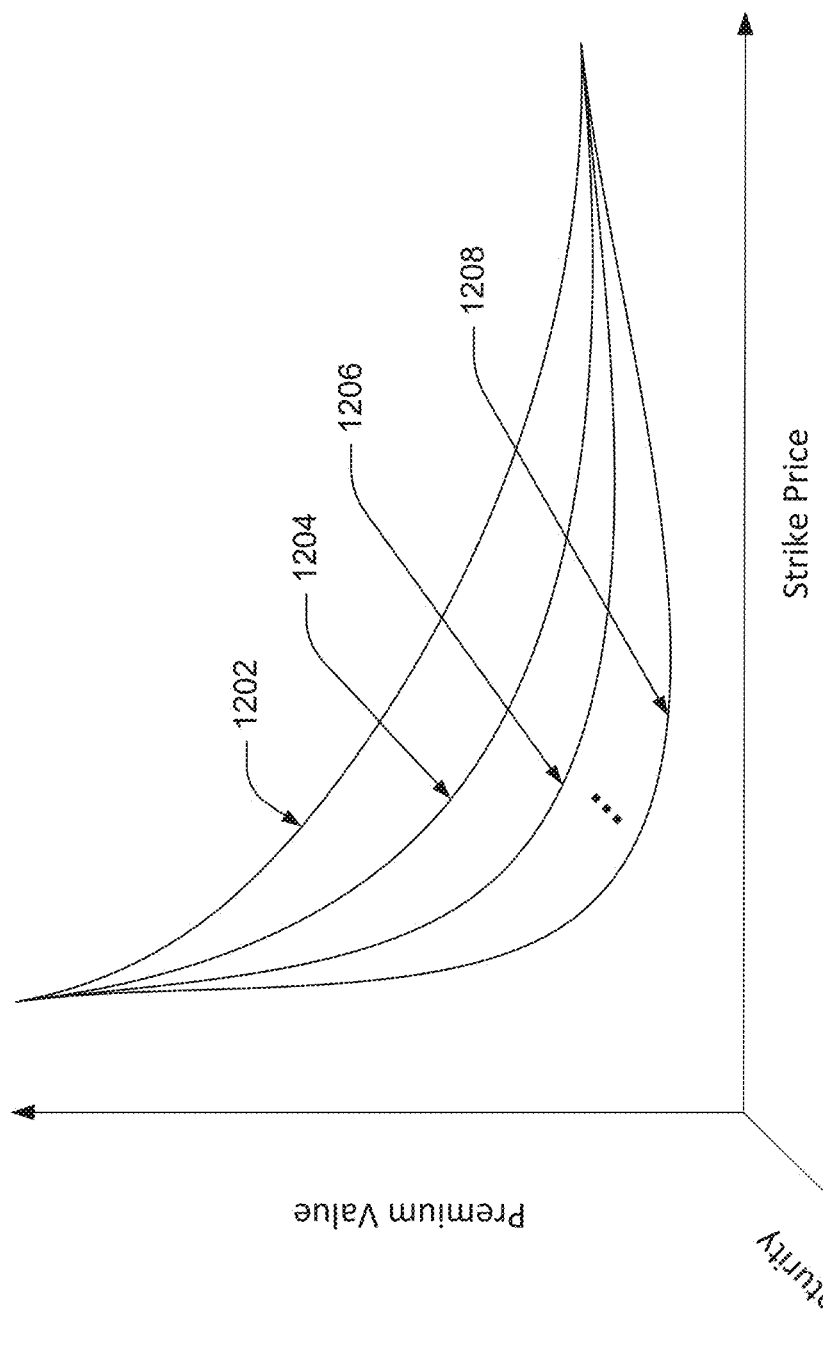
FIG. 12 also illustrates multiple equation-based curves in accordance with the disclosed embodiments.

An equation that defines how the premium value varies with more than one variable, e.g., with both strike price and maturity date, may be understood to define multiple different premium-strike price curves, like the curve shown FIG. 8 for example, at each different maturity over a bounded range of maturities. As shown in FIG. 12, for example, a trader may submit an equation that defines curve 1202 at maturity B1, curve 1204 at maturity B2, curve 1206 at maturity B3, and so on, until a curve is defined for each maturity date in the trading range, ending with curve 1208 at maturity B12, where the trading range is 12 months.

Each equation-based electronic data transaction request message may be associated with a quantity. If all of the quantity associated with an electronic data transaction request message is exhausted/satisfied/matched, the equation-based electronic data transaction request message is removed from the equation-based order book object.

In one embodiment, the exchange computing system may attempt to match each incoming curve with counter resting curves. For example, the exchange computing system may attempt to match an incoming (aggressing) acquire curve against multiple, e.g., two, previously resting relinquish curves. Which of the two resting relinquish curves is considered first may depend on priority rules. For example, the exchange computing system may consider resting equations in the order they were received by the exchange computing system.

The acquire curve may match both relinquish curves at different premium values. For example, the acquire curve could intersect the two relinquish curves at different points, where one relinquish curve provides a match at the 80 strike, and the other relinquish curve provides a match at the 82 strike. The exchange computing system may be configured to prioritize curves based on priority rules. For example, selecting a curve with which to match another curve (or equation), or selecting at which point to execute a transaction when many points satisfy two curves, may be left up to the individual market, or convention, defined in a simple FIFO manner, or could lead to pro-rata allocation.

For example, referring back to FIG. 10, the exchange computing system could execute a transaction at a premium of 5 at a strike price of 25, or could alternatively (depending on priority/allocation rules) execute a transaction at another point within the shaded region such as point 1004, which defines a combination of premium price 11 at strike price 34.

In one embodiment, the exchange computing system may specify rules limiting the types of curves that can be considered for matching. For example, the exchange computing system may only accept curves or equations that have at most one maximum and/or one minimum value.

Alternatively, the exchange computing system may be configured to accept and match equations that define a wide variety of shapes and/or functions, including linear functions (e.g., $y=m\ x+b$), power functions (e.g., $y=a\ x\hat{\ }b$), quadratic functions (e.g., $y=a\ x\hat{\ }2+b\ x+c$), polynomial functions (e.g., $y=a\_n \cdot x\hat{\ }n+a\_(n-1) \cdot x\hat{\ }(n-1)+\ \ldots\ +a\_2 \cdot x\hat{\ }2+a\_1 \cdot x+a\_0$), rational functions (ratio of two polynomials), exponential functions (e.g., $y=a\ b\hat{\ }x$), logarithmic functions (e.g., $y=a\ \ln(x)+b$), and sinusoidal functions (e.g., $y=a\ \sin(b\ x+c)$, where m, a, b, and c may be constants. In one embodiment, the exchange computing system may be configured to accept and match equations that define step functions. A software library may call a specific software function (discussed herein) that is configured to determine whether equations intersect based on the equation type/function.

The exchange computing system may also specify limits of premium prices and strike prices that can be matched. Referring back to FIG. 10, the exchange computing system may consider the overlapping region 1002 to end at a strike price of 50 and a premium value of 30. Thus, the exchange computing system places bounds on the range of values and strike prices that can be considered for matching.

The exchange computing system may determine whether two equations intersect, or share overlapping regions, or whether the same parameters satisfy the two equations, based on a variety of methods. In one embodiment, the transaction processor may determine whether two equations intersect using well known methods, such as Newton's method, which uses successively greater approximations of various points on the curve, e.g. by checking the values of the curve at every 10 increments on the X-axis, then every 5 increments for a particular subset of the X-axis, then every 1 increment, and so on until the range of intersection is known.

The transaction processor may access a software library including software functions that allows a computer processor to determine whether two equations intersect and/or overlap, and if so, at which coordinate(s)/parameters. For example, the transaction processor may be configured to access MATLAB® software which allows for engineering and scientific computations using a computer. The transaction processor may access MATLAB® functions such as LINSOLVE (for solving linear equations), FSOLVE (for solving systems of nonlinear equations of several variables), etc.

Alternatively, the transaction processor may access Mathematica, TK Solver, Maple, IDL, GNU Octave, Scilab, FreeMat, Julia, or SageMath software for determining intersections and/or solving/evaluating multiple equations. Or, the data transaction processing system may include code to enable equation matching/evaluating.

If the transaction processor determines that the equations do not equal each other at any coordinate (premium/strike price combination) within the bounded range analyzed/considered by the exchange computing system, and if any of the sell equation premium values are greater than any of the buy equation premium values at the same strike price, the transaction processor may determine that there is no match between the electronic data transaction request messages.

If the transaction processor determines that the equations do not equal each other at any coordinate (premium/strike price combination) within the bounded range analyzed/considered by the exchange computing system, and if any of the sell equation premium values are less than any of the buy equation premium values at the same strike price, the transaction processor may determine that a match can be executed at any of the values defined by either equation, or in the overlapping region therebetween.

If the transaction processor determines that the equations intersect at least once, the transaction processor may determine a range of overlap as described in connection with FIGS. 8 to 11. The transaction processor then selects one of the values from the overlapping region as the point, e.g., premium and strike price combination, at which to perform a match.

In one embodiment, the transaction processor may compare one incoming (aggressing) acquire curve or equation against all resting relinquish curves or equations, and for each relinquish equation, determine whether the acquire equation and relinquish equations overlap to define a region of acceptable points at which to execute a transaction. All relinquish equations are compared with the acquire equation to determine a set of acceptable matching regions, and one of the points within the region is selected for matching.

In one embodiment, the transaction processor may calculate the intersections of price equations by devolving the equations into individual prices at specific points. However, the transaction processor may only need to devolve a small portion of the equations, e.g., the portions of the equations that define the boundaries of the overlapping regions. To devolve the equations into individual prices/values at specific points, the transaction processor may compare prices at each price movement of the underlying, or each pre-defined increment of time (e.g., once per hour). For each defined strike price of the underlying:

for each bid curve in order of arrival, the transaction processor calculates the price at that strike price; and for each offer curve in order of arrival, the transaction processor calculates the price at that strike price and determines if the prices have crossed the bid side.

If the prices have crossed the bid side, the transaction processor executes a match, clears remaining quantity on the curves that crossed, and removes curves with remaining quantity of zero.

As discussed above, the equations define the value of the premium in terms of strike price, underlying financial instrument's current/trading price, maturity, volatility, interest rate. In addition, the equation may account for, or vary with, a fee structure variable included by the trader. Any variable that modifies the price/premium a trader is willing to pay may be incorporated into an equation used by the trader. Moreover, the trader may scale any of the aforelisted variables with a coefficient or multiplier to magnify or abate the impact of a particular variable on the premium. If the data transaction processing system stores equations in the order book object (e.g., FIG. 7), the data transaction processing system periodically evaluates the equations.

Unlike discrete-value-based order book objects, the equation-based order book objects store equations that can vary as conditions change. Thus, the equations must be periodically evaluated as conditions change to determine whether two resting equations match. In one embodiment, the data transaction processing system may periodically attempt to match one or more of the resting questions with one or more resting equations counter thereto.

Referring back to FIG. 7, equations 1 through 6 may be numbered in the order they were received by and stored in the equation-based order book object 700. The data transaction processing system may periodically evaluate equation 1 (the first received resting equation) against equations 4, 5 and 6 (in that order), which are all counter to equation 1. Thus, the data transaction processing system in essence treats equation 1 as if it was received as a new incoming electronic data transaction request message that is evaluated against resting electronic data transaction request messages. Thus, equation 1 is compared with equation 4 for a possible match. If equations 1 and 4 intersect, for example, the match engine module executes a transaction at the point of intersection. If equations 1 and 4 do not intersect and there is no match (e.g., all premium values associated with equation 1 are less than all of the premium values associated with equation 4), equation 1 is compared with re-evaluated equation 5, and so on.

The times at which resting equations are re-evaluated for matches may vary. In one embodiment, equations may be re-evaluated periodically, where the period decreases with time. For example, if the expiration date for an equation-based financial instrument is fixed, and the expiration date is three weeks away, resting equations may be re-evaluated daily. But when the expiration date is two weeks away, resting equations may be re-evaluated twice a day, and when the expiration date is one day away, resting equations may be re-evaluated every hour.

Alternatively, or in addition thereto, the change in the parameters for variables based on external conditions (e.g., interest rate) may trigger equation re-evaluation or re-computation for the equations in an equation-based order book object. Or, activity in the underlying financial instrument, such as trade activity, e.g., the underlying financial instrument's price moves due to a trade, may trigger equation re-evaluation or re-computation for the equations in an equation-based order book object.

In one embodiment, the transaction processor may be configured to optimize how often re-evaluations are performed. For example, the exchange computing system may store predetermined thresholds. The data stored in an equation-based order book object is re-calculated when the threshold are reached. For example, in a market with only a single buyer and seller, the transaction processor can calculate that, absent a change from the traders themselves, their two pricing curves will not intersect until such time that the underlying's price moves below 80, or the time to expiry moves below 5 days. The transaction processor could then eliminate checking for recalculation and matching until such time as one or both of the conditions is true. Thus, the disclosed embodiments can be implemented to reduce the total number of recalculations related to matching.

The transaction processor accordingly determines whether a transaction (e.g., a match) can be processed based on equations. If the two counter (e.g., one buy, one sell) equations are determined to be equal each other (e.g., their curves intersect) based on parameters within a bounded trading range for both equations, the transaction processor selects the coordinate (e.g., a premium price and a strike price) where the two equations equal each other or intersect to execute the requested transaction.

In one embodiment, the data transaction processing system, including the transaction processor, determines whether two equations match, for purposes of executing a transaction based on the two equations, by analyzing characteristics of the two equations. In particular, the equation-based data transaction processing system quickly and more efficiently determines whether the acceptable regions defined by two equations intersect and/or overlap.

Figure 13:
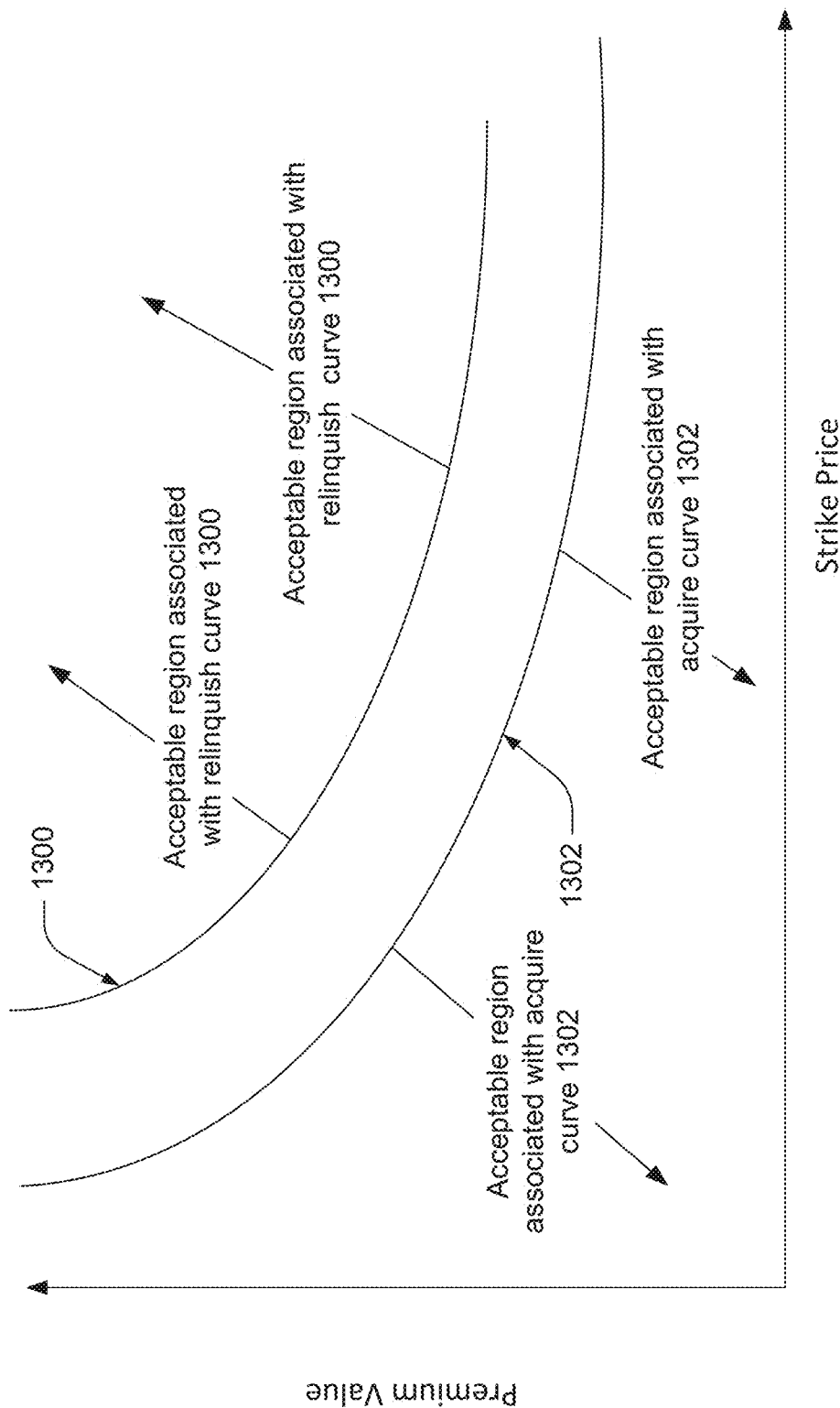
FIG. 13 also illustrates multiple equation-based curves in accordance with the disclosed embodiments.

For example, in cases where two equations do not intersect, and their acceptable regions do not overlap at all, the transaction processor can quickly determine that there is no match scenario between these two equations. The transaction processor can make these determinations much faster and more efficiently than attempting to match/checking discrete values for multiple different order books. FIG. 13 illustrate two example curves 1300 and 1302. Curve 1300 is a relinquish curve (e.g., based on an equation-based electronic data transaction request message requesting relinquishing a quantity of the target financial instrument), and as such defines the lower limit of an acceptable region of premium values. Curve 1302 is an acquire curve (e.g., based on an equation-based electronic data transaction request message requesting acquiring a quantity of the target financial instrument), and as such defines the upper limit of an acceptable region of premium values. As shown in FIG. 13, the acceptable regions associated with curves 1300 and 1302 do not overlap at all. As discussed above, the transaction processor checks for overlapping acceptable regions over a range of strike and premium values. Thus, the equations associated with curves 1300 and 1302 may actually intersect at some premium/strike combination, but that intersection may be outside of the bounded range within which the transaction processor checks for matches. Accordingly, the equation-based transaction processor can quickly conclude that curves 1300 and 1302 do not match at all. In contrast, non-equation-based transaction processor would have to check, for each strike price, whether the premium for that strike price results in a match against the order book object associated with that strike price. If a trader submits 500 different messages relating to 500 different strike prices, a non-equation-based transaction processor would need to access 500 different order books (one for each strike price) to determine if the premium at that strike price results in a match/transaction.

In one embodiment, the transaction processor may determine matching points based on a premium price and a maturity. Or, the transaction processor may determine matching points based on a premium price, a strike price, and a maturity.

The system may access or implement equation plotting software to plot and determine intersections of the curves.

The point of intersection in the case where the premium varies with one of strike price or maturity, or plane of intersection in the case where the premium varies with both strike price and maturity, may represent the most efficient match between two counter electronic data transaction request messages. In some cases, the exchange computing system may need to round up or round down the actual values to the nearest tick size. For instance, referring back to FIG. 10, curves 800 and 900 are shown as intersecting at point 1000 corresponding to premium price 5 at strike price 25, and the exchange computing system executes a transaction (a match) at that combination of premium and strike price between the two submitting entities of the two equation-based electronic data transaction request messages.

If, instead, point 1000 corresponded to premium price 5.3 and strike price 25.8, the exchange computing system may round the premium price and strike price up or down to a nearest tick that is still included in a region that is acceptable to both parties. For example, the transaction processor may execute a match at premium price 6 and strike price 26 if that point is above the relinquish equation's premium value at strike price 26 and below the acquire equation's premium value at strike price 26.

Equation-based matching may result in more accurate price discovery because the transaction processor can locate the exact point where two strategies (e.g., two counter equations) converge, without the client computers needing to submit a position for each granular position. In discrete-value-based matching, the traders can only submit quotes based on the granularity offered by the exchange. As discussed herein, as the number and variety of products/tick sizes offered by the exchange computing system increases, the complexity and computing resources to maintain and support the trading environment increases. An exchange computing system that allows traders to quote premium values at $0.01 increments, and strike prices at $0.05 increments, for example, checks for matches at those corresponding resolutions. Using equation-based matching, a transaction processor may be able to identify the most efficient match between two curves and thereafter, on the fly, generate a tradable financial instrument at the point of intersection, or the nearest acceptable point of intersection.

In one embodiment, equation-based matching may generate matches at a wider variety of premium prices than discrete-value-based matching, and allow customers to match at more precise/desirable values. In discrete-value-based matching, where the transaction processor attempts to match discrete values for each financial instrument, two customers' counter messages can only match at the individual premium/strike values offered (or made available) by the exchange computing system. As discussed above, the more choices for premium, strike prices and maturities offered by an exchange computing system, the greater the precision with which traders can specify their desired combinations, which in turn leads to more accurate and efficient price discovery.

For example, a traditional system may offer strikes at 87 and 88. The actual value where two customers' desired trading strategy intersects may be 87.34. However, in the traditional systems a match at 87.34 may not be possible because that is not a value made available by the exchange computing system for transaction. In equation-based matching, the exchange computing system could be configured to execute a transaction at 87.34. Alternatively, the exchange computing system may be configured to round up or down to some other value that conforms with the electronic data transaction request messages. Regardless, equation-based matching offers greater flexibility for the exchange computing system and its customers because the exchange computing system can determine the optimum solution for two equations and can also determine the exact point at which to execute a transaction based on customers' equation-based electronic data transaction request messages. In one embodiment, the exchange computing system may consider/evaluate continuous equations for matches, and can thus detect and execute a match at any value that satisfies both equations, increasing the flexibility and configuration offered to its customers.

Moreover, the exchange computing system could be configured to allow an administrator or operator of the exchange computing system to modify the granularity/resolution at which matches are executed. For example, the exchange computing system may allow for equation-based matching of a financial instrument across a range of 1,000 strikes, e.g., from $500 to $1,500, with tick increments of $1. However, if the exchange computing system receives thousands or tens of thousands of messages for the financial instrument, the exchange computing system may dynamically allow for equation-based matching in that range with tick increments of $0.50. Thus, the exchange computing system can double the resolution at which it can execute matches. This is convenient for traders because traders do not have to modify how they submit their positions. Traders can continue to submit equation-based electronic data transaction request messages without concerning themselves with the tick size the exchange computing system will implement. In discrete-value-based matching, the exchange computing system would have to first change the listing for the financial instrument to notify all market participants that they may quote at $0.50 tick sizes instead of $1, and the traders may then need to modify their previously submitted messages to account for the increased resolution now allowed by the exchange computing system. Thus, equation-based matching increases the flexibility and efficiency with which an exchange computing system can implement trade matching.

In one embodiment, upon determining that two equations intersect and that a transaction should therefore be executed at a particular combination of premium price, strike value (and/or maturity), the exchange computing system may assign an unused International Securities Identification Number (ISIN) to the match/transaction, and disseminate information about the match to message pattern via market data. In one embodiment, the exchange computing system may first perform a check to determine if an ISIN has been previously created for the strike value (and/or maturity), and if so, align the match to occur at the already used strike, then disseminate at that ISIN. This minimizes ISIN creation/use and thus administrative burden on the data transaction processing system.

An exchange computing system accordingly makes options contracts available for trading at different premiums that specify different strike/exercise prices and different maturities. Traders trade on the financial instruments offered by an exchange computing system at the different premium and strike prices and maturities offered, or made available, by the exchange computing system. The more financial instruments offered by an exchange computing system, and the more choices for corresponding premium and strike prices and maturities (which may also be separate financial instruments for each offered strike price and maturity), the greater the precision with which traders can specify their desired combinations, which in turn leads to more accurate and efficient price discovery. Yet offering a large amount of financial instruments and corresponding choices for premiums, strike prices and maturities creates a computing resource burden for the exchange computing system and the client computers. An exchange computing system expends computing resources to maintain all the information necessary to list and trade the instruments, and report activity via individual messages or market data feeds back to the client computers. Moreover, the exchange computing system recalculates a large amount of data for financial instruments as underlying data, e.g., underlying financial instrument prices, changes, and as economic conditions change. In some instances, e.g., when an underlying futures contract is experiencing high volatility, the exchange computing system may perform hundreds or thousands of recalculations per second. Recalculated data is then re-transmitted to the client computers, e.g., in the form of market data feeds.

For example, if a futures contract A trades around value 100, the exchange computing system may list a corresponding (derivative) options contract B1 with a strike price of 100 and a maturity at the end of a given month, e.g., the current month. The exchange computing system may also offer or make available for trading various other maturities, such as at the end of each of the next eleven months, B2 through B12. The exchange computing system accordingly creates twelve new financial instruments, B1 through B12, based on A. Moreover, as the first month from the twelve months, i.e., the current month, ends, contract B1 expires, and the exchange computing system creates a new contract B13, to maintain a twelve month rolling window of options contracts based on A.

The exchange computing system also creates twelve new order book objects (one for each of the twelve options contracts), and also reports changes to each order book object via twelve new market data feeds. Each of the twelve different contracts is associated with a strike price of 100, but expires in twelve different months (i.e., each has a different maturity). In this case, the maturity parameter can vary, but the strike price is fixed at parameter 100.

From the perspective of most traders, however, trading on options for only one strike price, e.g., 100, is typically not enough meaningful trading variety or choice. Traders may want to trade on other strike prices, not just a strike price of 100. The exchange computing system may thus offer options products with a reasonable range of strike prices. For a futures contract that trades very close to 100 on a regular basis, the exchange computing system may offer a strike price range of 95 to 105, with increments (tick size) of 0.5. Thus, the exchange computing system lists 22 new options contracts for each month in the twelve month rolling window, and thus creates 22×12 new options contracts, or 264 new options contracts, based on futures contract A. If the range of available strike prices is increased to 90 to 110 for some of the months, e.g., for months seven through twelve, to provide a wider trading range due to uncertainty about where prices will be in those months, months seven through twelve will have 20 additional strike prices. Accordingly, the exchange computing system then offers 384 total new financial instruments, namely, 22 strike prices×6 months plus 42×6 months=384 new contracts. Finally, the exchange computing system lists options contracts for two sides, put versus call, thus doubling the amount of new contracts. The total number of financial instruments as described in this example is now 384×2=768 new options contracts that are listed/offered/made available by the exchange computing system to able to reasonably trade (e.g., variety of strike prices around the currently trading price of 100, over a twelve month rolling window) options on futures contract A. Some of these 768 new options contracts expire every month, and the exchange computing system generates and lists additional contracts to maintain a twelve month rolling window of options. The exchange computing system may need to create 768 new order book objects (one for each of the 768 options contracts), and also reports changes to each order book object via 768 new market data feeds.

As the trading value of futures contract A varies, e.g., moves to 115 from 100, the exchange computing system may need to recalculate the strike prices of each of the 768 new contracts. And, the exchange computing system also offers different premiums (the price at which a trader would like to buy one of the 768 options contracts) for each contract, thus increasing the amount of data that is maintained, received, and recalculated as conditions change. Thus, offering ranges of options on a single futures contract can mean a thousand-fold increase in the magnitude of data that is maintained, stored and processed by the exchange computing system.

If the underlying financial instrument is a spot (i.e., underlying) product with high volatility or a need for shorter maturities increments, more strikes and maturities may be needed. The number of instruments that need to be quoted, listed, and published quickly grows to thousands of times larger than the number of underlying products. Because the prices of derivative instruments are dependent on the price of the underlying, a single price move of the underlying (which can occur if the underlying trades at a new value submitted by a customer) can correlate to tens or hundreds of thousands of updates for the derivative instruments.

Thus, the exchange computing system balances the granularity and variety of derivative offerings against the computing cost of maintaining, calculating and proliferating a massive amount of data. If the exchange computing system does not offer enough financial instrument variety, price discovery and trader interest becomes limited. But if the exchange computing system offers a high amount of financial instrument variety, the capacity of trading systems to match, track, and price all of the products available can become exceeded.

Implementing equation-based electronic data transaction request messaging may reduce (e.g., compress) the overall number of financial instruments (and therefore, the number of order book objects and market data feeds) listed, processed and maintained by the exchange computing system. A large number of different strike and maturity combinations can all be represented within one equation as parameters of a single financial instrument. The different parameters may all relate to a common underlying financial instrument. The exchange computing system no longer needs to list and process each different strike price and/or maturity as a different financial instrument.

Listing financial instruments, or making financial instruments available for trading, by an exchange computing system increases administrative complexity and computing resources needed to maintain a trading environment for the financial instrument. The disclosed embodiments accordingly reduce the complexity and computing resources (e.g., memory, storage, processors) needed to offer/make available and maintain financial instruments for trading.

Figure 14:
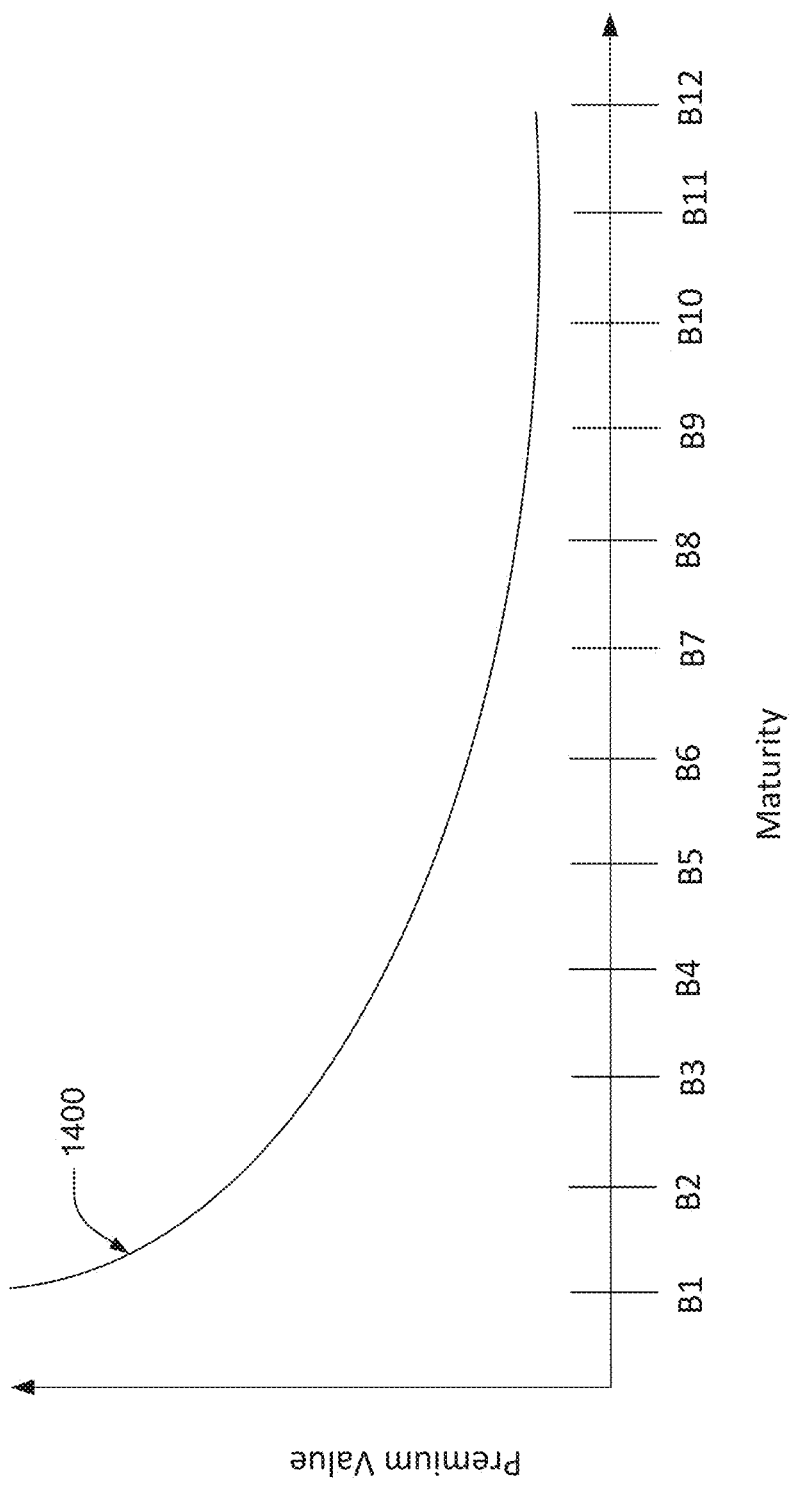
FIG. 14 illustrates an example equation-based curve in accordance with the disclosed embodiments.

FIG. 14 illustrates a curve 1400 based on an equation-based electronic data transaction request message. Curve 1400 is associated with different maturities B1 through B12, and is also associated with a fixed strike price for an underlying financial instrument. Each of the different maturities can be represented by the curve 1400. A trader wishing to submit premium values for 12 different months (B1 through B12) at the fixed strike price does not need to trade on 12 different financial instruments. Accordingly, the exchange computing system also does not need to list 12 different financial instruments. The exchange computing system only needs to list one financial instrument, that specifies a strike price, for options based on underlying futures contract A.

Similarly, the disclosed embodiments may be used to make available different strike prices for a fixed maturity date. For example, the exchange computing system may offer a financial instrument associated with a March maturity month. A trader may be able to submit an equation-based electronic data transaction request message that defines a range of premiums for a range of strike prices, e.g., ten different strike prices. In traditional systems, the ten different strike prices for March options contracts are typically listed as different/unique financial instruments, each associated with its own order book data structure, market data feed, etc. Each of the ten different prices requires the exchange computing system to list, or make available for trading, ten different options contracts (i.e., financial instruments). The disclosed embodiments eliminate the need for the exchange computing system to list a new financial instrument for each different strike price. The exchange computing system need only list the underlying futures contract as a financial instrument, because the trader can refer to just one underlying futures contract, and specify different strike prices for that underlying financial instrument as parameters of an equation-based financial instrument.

The disclosed embodiments may also be implemented in situations where neither the strike price nor the maturity date is fixed in the financial instrument. The exchange computing system may offer a financial instrument for trading, where the premium desired by the trader varies with both the strike price and the maturity date. The trader accordingly submits an equation-based electronic data transaction request message defining the premium which fluctuates with both the strike price of the underlying financial instrument and the maturity date.

As discussed herein, customers may desire to transact on multiple financial instruments that are related to each other in some way. Or, traders such as market makers may wish to submit different positions on different financial instruments or strike prices. Customers may frequently update their positions, and the outstanding quantity associated with these positions, as trades are executed.

For example, a trader may want to purchase 100 options between strikes 70 and 90 (with a tick size of 1) for a common underlying financial instrument. The trader's strategy may not be tied to any one particular strike. In discrete-value-based messaging, the trader may need to submit 21 different messages, one for each strike, where each message is associated with the desired quantity of 100, to implement this strategy. The trader accordingly advertises a total liquidity of 2100 (21×100), which is much higher than the desired quantity of 100. If one or more of the messages results in a match, the trader may submit additional messages to modify the number of outstanding/resting messages, or to modify the quantities associated with the messages. The client computer associated with the trader may monitor the status of the 21 electronic data transaction request messages, and adjust/reduce the resting quantity associated with the orders as strikes are executed. Because there is a possibility that a larger than desired number of options may be executed before the trader can react and cancel existing orders, the trader is exposed to a high amount of risk. For instance, new orders counter to the trader's resting quantity may match with several of the trader's orders, resulting in execution of more than the 100 options desired by the trader. For example, new orders for 100 options at strikes 70, 71, and 72, may match with the 100 units resting at 70, 71, and 72, respectively. The trader may be able to cancel all of the other messages associated with strikes 73 through 90, but the trader, whose strategy only called for purchasing 100 options total between strikes 70 and 90, now possesses 300 options at strikes 70, 71, and 72. Discrete-value-based messaging can thus cause traders to over-advertise liquidity, resulting in inefficient markets and undesirable trade execution.

Some exchange computing systems may offer protection processes that minimize execution of undesirable trades. For example, an exchange computing system may implement a rule that if one of the strike values associated with an underlying financial instrument is matched, all of the other pending orders for that client associated with the same underlying financial instrument are removed/deleted from the system.

Equation-based messaging can reduce over-advertisement of actual liquidity, and also reduce the amount of monitoring, updating, and messaging performed by client computers. Instead of submitting different messages/financial instruments where each is associated with a quantity, equation-based messaging allows the trader to associate an equation with a quantity. For example, all of the different strike prices associated with the same equation-based electronic data transaction request message are associated with one quantity field, e.g., quantity field 412 or 512. A data transaction processing system that receives an equation-based message, including a quantity, can easily update the single quantity field value upon execution of a trade that satisfies some or all of the quantity. An equation-based data transaction processing system may treat all strikes, maturities, or combinations of strikes and maturities as part of the same pricing equation. The exchange computing system can accordingly advertise just 100 units associated with an entire equation. Thus, the trader may submit an equation that defines the strikes between 70 and 90, and would associate 100 units with the equation. The trader is only associated with 100 units, not 2100, when trading on an equation-based data transaction processing system. For example, an equation-based message associated with quantity 100 may match 40 units of a strike price/premium value combination encompassed by the equation-based message. The exchange computing system thus updates/reduces the quantity associated with the electronic data transaction request message to 60. The client computer no longer needs to monitor that some of the strikes in a multi-strike strategy have been executed, or modify the advertised quantity associated with the remaining/resting strikes.

Matching equations removes the need to maintain linked orders, because the exchange computing system treats all values arising from the same equation as being linked. Thus, one equation may represent one or more sets or ranges of values. If the transaction processor executes a match at any one of the values defined by the equation, the transaction processor needs to only adjust (i.e., reduce) the quantity associated with the equation. Every other value defined by the equation thus becomes associated with the reduced quantity. There is no need, in equation-based matching as disclosed herein, to check for linked orders or modify linked orders each time a match is executed.

In one embodiment, traders may submit equation-based messages even if the target financial instrument is not an equation-based financial instrument. The exchange computing system may then devolve each equation-based electronic data transaction request message into the different financial instruments represented by the single equation-based electronic data transaction request message.

In one embodiment, a data transaction processing system that matches discrete values may include a match engine/order book linker that receives equation-based electronic data transaction request messages and devolves a message into discrete values for financial instruments encompassed in the electronic data transaction request message. The linker may be implemented as a linking processor.

Figure 15:
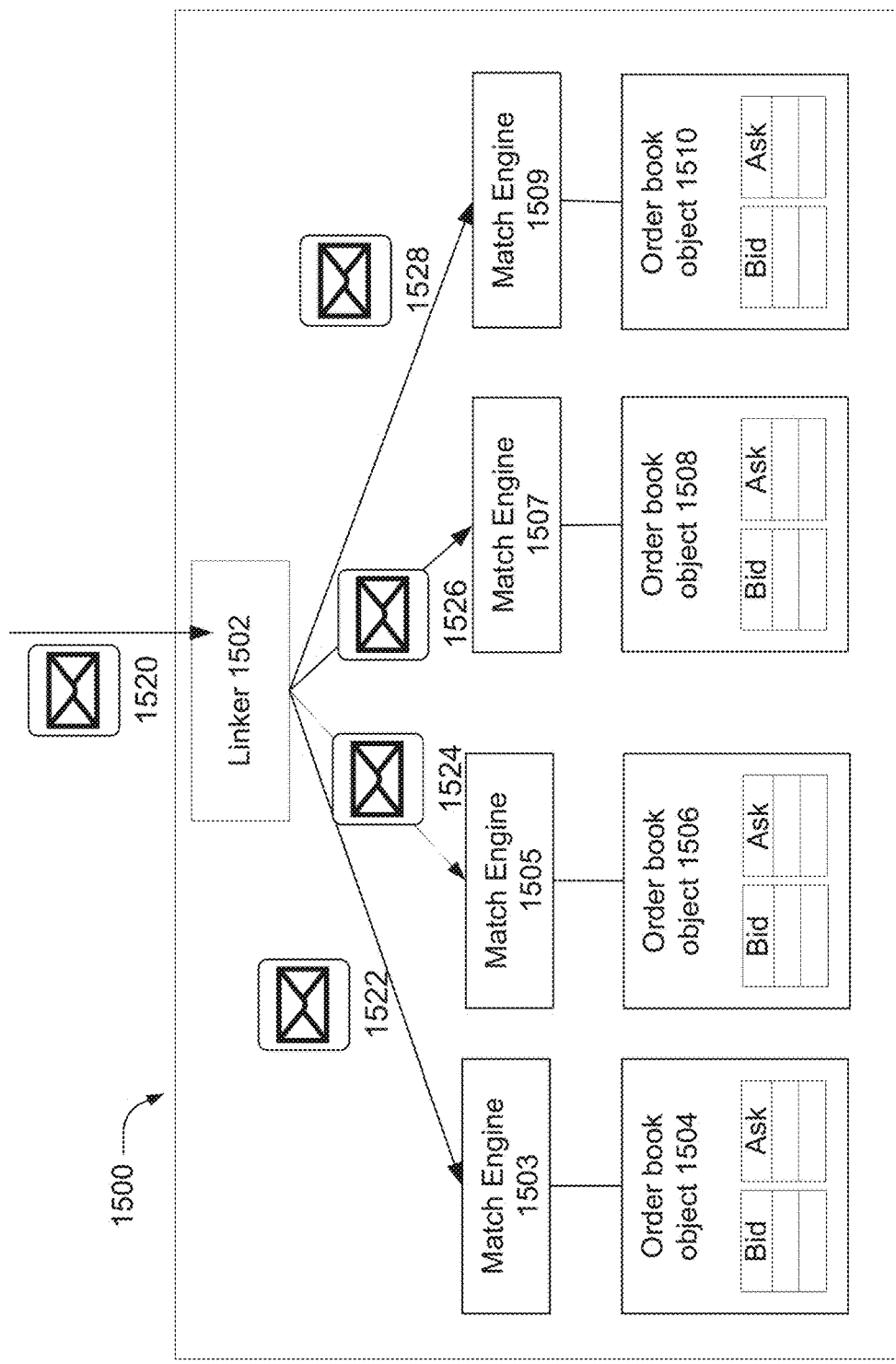
FIG. 15 illustrates an example data transaction processing system including a match engine/order book object linker in accordance with the disclosed embodiments.

FIG. 15 illustrates an example data transaction processing system 1500 including linker 1502, match engines 1503, 1505, 1507 and 1509, and order book objects 1504, 1506, 1508 and 1510. Match engine 1503 corresponds to order book object 1504. Match engine 1505 corresponds to order book object 1506. Match engine 1507 corresponds to order book object 1508. Match engine 1509 corresponds to order book object 1510. Moreover, each match engine and its corresponding order book object is associated with one financial instrument. For example, the data transaction processing system 1500 in example FIG. 15 offers for trading four different financial instruments, one associated with each of match engines 1503, 1505, 1507 and 1509.

Match engines 1503, 1505, 1507 and 1509 may match discrete values. Accordingly, order book objects 1504, 1506, 1508 and 1510 store discrete values for different financial instruments. Although data transaction processing system 1500 matches discrete values, data transaction processing system 1500 may be configured to receive both equation-based electronic data transaction request messages and discrete-value-based electronic data transaction request messages. If data transaction processing system 1500 receives an equation-based electronic data transaction request message, linker 1502 devolves the equation-based electronic data transaction request message into multiple discrete-value-based electronic data transaction request messages.

Linker 1502 assigns the quantity associated with the equation-based electronic data transaction request message to each of the multiple discrete-value-based electronic data transaction request messages. For example, an example equation-based electronic data transaction request message 1520 may include a quantity of 50, and may define a different value (e.g., price) for each of the financial instruments associated with match engines 1503, 1505, 1507 and 1509. Linker 1502 devolves equation-based electronic data transaction request message 1520 into four different discrete-value-based electronic data transaction request messages 1522, 1524, 1526 and 1528. Each of messages 1522, 1524, 1526 and 1528 is associated with a quantity of 50 and is transmitted to its respective match engine/financial instrument, as shown in FIG. 15.

Each match engine is configured to match, or attempt to match, a received discrete-value-based message with resting orders. If any one of the match engines matches one of the respective messages, the match engine notifies the linker that the quantity associated with the message has changed. For example, if match engine 1509 executes a match against message 1528 for a quantity of 24, match engine 1509 sends a message to linker 1502 about the match. Linker 1502 updates the quantity associated with messages 1522, 1524, and 1526 to be 26 (i.e., initial quantity of 50 minus matches quantity of 24). Thus, each of order book objects 1504, 1506, 1508 and 1510 stores a quantity of 26 associated with the corresponding message.

Figure 16:
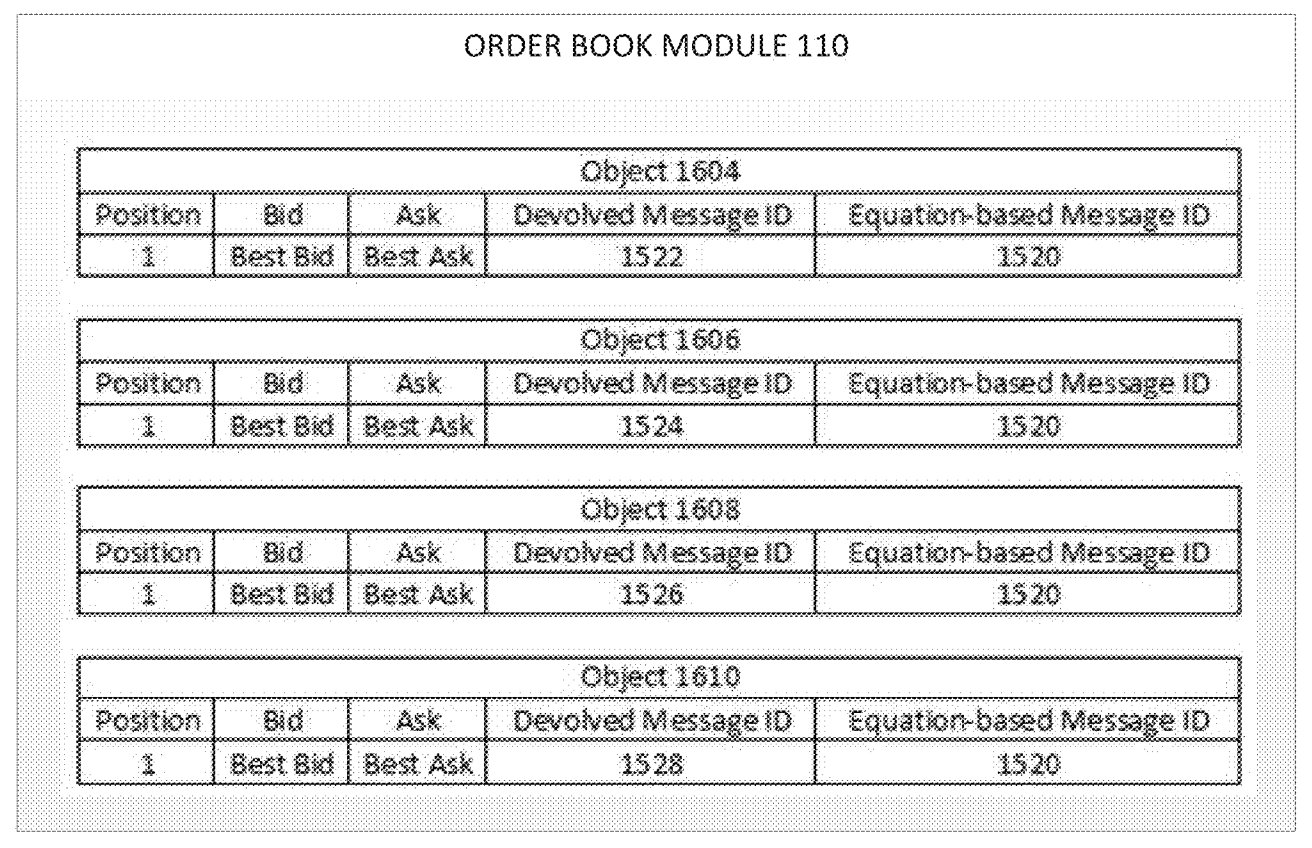

FIG. 16 illustrates an example order book module 110 including an example data structure 1604 for order book object 1504, which may represent the state of an electronic marketplace associated with a financial instrument associated with match engine 1503. Order book module 110 also includes an example data structure 1606 for order book object 1506, which may represent the state of an electronic marketplace associated with a financial instrument associated with match engine 1505. Order book module 110 also includes an example data structure 1608 for order book object 1508, which may represent the state of an electronic marketplace associated with a financial instrument associated with match engine 1507. Order book module 110 also includes an example data structure 1610 for order book object 1510, which may represent the state of an electronic marketplace associated with a financial instrument associated with match engine 1509.

As discussed with respect to FIG. 3A to 3C, the Bid and Ask queues of the order book objects in FIG. 16 may correspond to requests to perform transactions. A position field identifies the position of each entry within each queue. An entry can accordingly be referenced by its position and queue name, e.g., position 3 in the Ask queue of object 1604. The transaction type field 404 of equation-based message 1520 may be used to specify whether the request is to purchase (buy) or relinquish (sell) a quantity (field 412, e.g., 50) of the financial instrument corresponding to the object 1604. The state of object 1604 may be initially blank (e.g., reset to zero at the beginning of a trading week), and each order that is submitted to and processed by the corresponding transaction processor 1509 results in a modification to the state of the object 1604.

As shown in FIG. 16, each order book object stores information about the equation-based message 1520, which was devolved into multiple discrete-value-based messages. Each order book object also stores information about one corresponding discrete-value-based message. Order book object 1604 stores identification information for equation-based electronic data transaction request message 1520 and discrete-value-based electronic data transaction request message 1522. Order book object 1606 stores identification information for equation-based electronic data transaction request message 1520 and discrete-value-based electronic data transaction request message 1524. Order book object 1608 stores identification information for equation-based electronic data transaction request message 1520 and discrete-value-based electronic data transaction request message 1526. Order book object 1610 stores identification information for equation-based electronic data transaction request message 1520 and discrete-value-based electronic data transaction request message 1528.

In one embodiment, an equation-based exchange computing system disseminates price data resulting from performing matches/transactions as equations. In one embodiment, the exchange computing system may convert the set of best buy and sell prices for a product into a standard pricing algorithm, such as Black-Sholes. In one implementation, the equation-based system's market data generator stores the best price at each of a set of pre-determined strikes. The market data generator then evaluates a set of chosen price equations for the entire set of strikes as well as for subset of strikes, with slightly different input variables, and iterates using a simulated annealing algorithm, until the resulting equation produces a set of prices that matches a contiguous set of the stored best prices. The resulting equation is then communicated to market data participates. Thus, customers can receive one equation that represents hundreds of different price points. As the order book for a product changes, the exchange computing system can update the resulting equation to reflect the changes.

Figure 17:
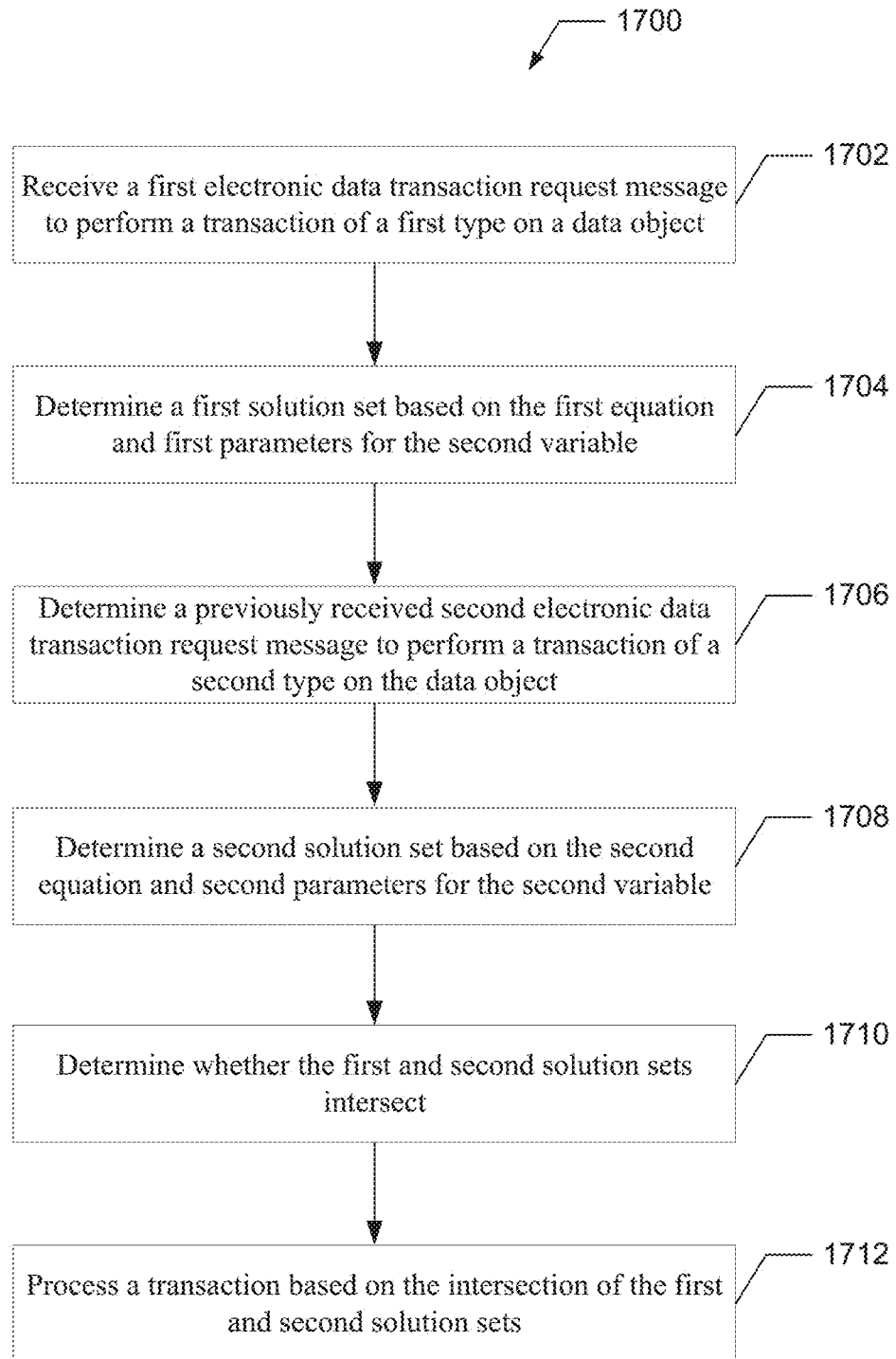
FIG. 17 illustrates an example flowchart for implementing the disclosed embodiments

FIG. 17 illustrates an example computer implemented method 1700 for processing electronic data transaction request messages in a data transaction processing system in which data objects are transacted by transaction processors that match electronic data transaction request messages for data objects received from different client computers over a data communications network. Embodiments may involve all, more or fewer actions indicated by the actions of FIG. 17. The actions may be performed in the order or sequence shown or in a different sequence.

At step 1702, method 1700 includes receiving, by a transaction processor, a first electronic data transaction request message to perform a transaction of a first type on a data object. The first electronic data transaction request message includes data representative of a first equation that includes a first variable and a second variable.

For example, a solution set may be a set of values for the first variable and the second variable that can be used to evaluate the respective equation. In one embodiment, the solution set may include all of the pairs of values for the first and second variable that satisfy the respective equation.

The equation, as discussed above, may be a pricing equation submitted to the data transaction processing system via an electronic data transaction request message. The equation may define a relationship between premium prices and strike prices for a financial instrument. The solution set includes every premium price/strike price combination that is a solution for the equation. In other words, the solution set includes, for every strike price that is evaluated by the transaction processor, the resulting value for the premium price according to the respective equation.

At step 1704, method 1700 includes determining, by the transaction processor, a first solution set based on the first equation and first parameters for the second variable. The first solution set includes combinations of values for the first variable and corresponding first parameters for the second variable, wherein the data representative of the first equation is smaller than data representative of the first solution set. In one embodiment, the data representing the equation may be a compression of the data representing the solution set.

As described herein, equation-based electronic data transaction request messages are smaller in size than the messages that would be necessary to convey that same information using discrete-value-based electronic data transaction request messages.

At step 1706, method 1700 includes determining, by the transaction processor, a previously received second electronic data transaction request message to perform a transaction of a second type on the data object. The previously received second electronic data transaction request message includes data representative of a second equation that includes the first variable and the second variable.

At step 1708, method 1700 includes determining, by the transaction processor, a second solution set based on the second equation and second parameters for the second variable. The second solution set includes combinations of values for the first variable and corresponding second parameters for the second variable, wherein the data representative of the second equation is smaller than data representative of the second solution set.

At step 1710, method 1700 includes determining, by the transaction processor, whether the first and second solution sets intersect.

At step 1712, method 1700 includes, upon determining that the first and second solution sets intersect, processing, by the transaction processor, a transaction based on the intersection of the first and second solution sets. It should be appreciated that the results of the processing are the same as if the client computer had transmitted several discrete-value-based electronic data transaction request messages, instead of the equation-based electronic data transaction request message, as discussed herein. If the client computer had transmitted several discrete-value-based electronic data transaction request messages, the separate values would have to be separately processed by the transaction processor.

Figure 18:
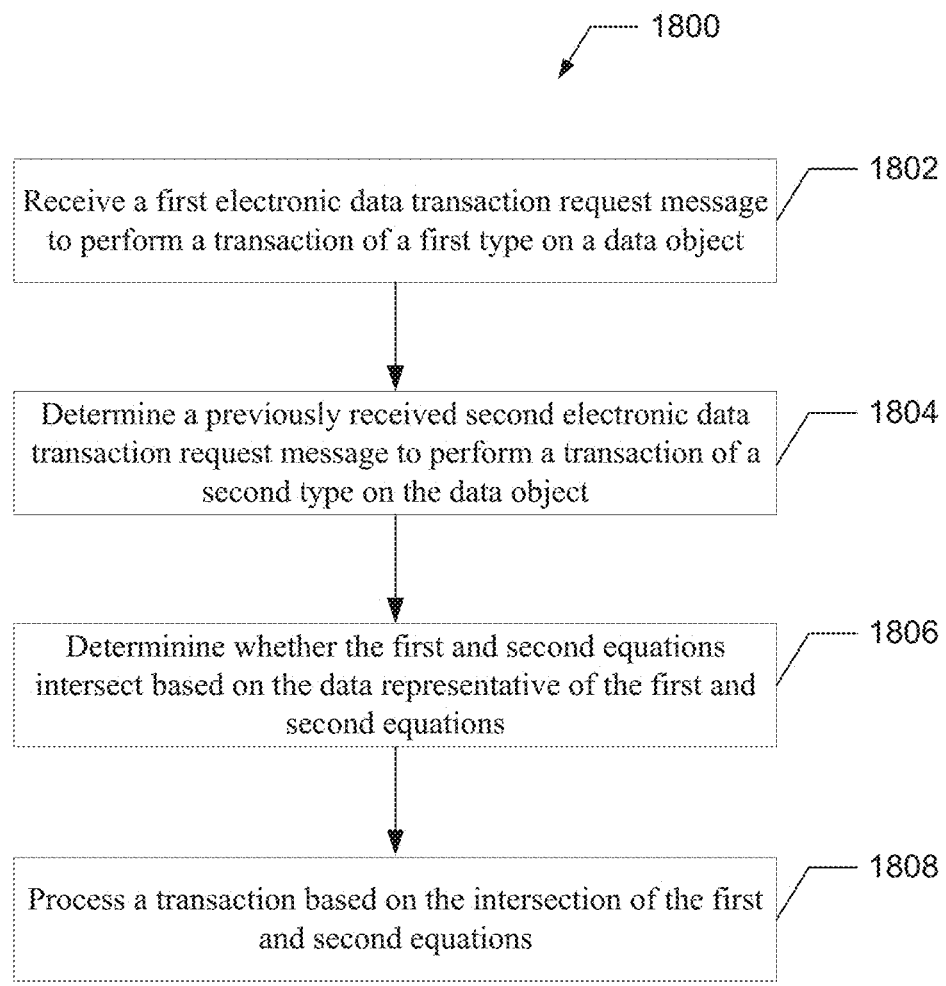
FIG. 18 illustrates another example flowchart for implementing the disclosed embodiments

FIG. 18 illustrates an example computer implemented method 1800 for processing electronic data transaction request messages in a data transaction processing system in which data objects are transacted by transaction processors that match electronic data transaction request messages for data objects received from different client computers over a data communications network. Embodiments may involve all, more or fewer actions indicated by the actions of FIG. 18. The actions may be performed in the order or sequence shown or in a different sequence.

At step 1802, method 1800 includes receiving, by a transaction processor, a first electronic data transaction request message to perform a transaction of a first type on a data object. The first electronic data transaction request message includes data representative of a first equation that includes a first variable and a second variable, wherein the data representative of the first equation is smaller than data representative of a first solution set including values for the first variable and corresponding parameters for the second variable.

At step 1804, method 1800 includes determining, by the transaction processor, a previously received second electronic data transaction request message to perform a transaction of a second type on the data object. The previously received second electronic data transaction request message includes data representative of a second equation that includes the first variable and the second variable, wherein the data representative of the second equation is smaller than data representative of a second solution set including values for the first variable and corresponding parameters for the second variable.

At step 1806, method 1800 includes determining, by the transaction processor, whether the first and second equations intersect based on the data representative of the first and second equations.

At step 1808, method 1800 includes, upon determining that the first and second equations intersect, processing, by the transaction processor, a transaction based on the intersection of the first and second equations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for processing electronic data transaction request messages in a data transaction processing system in which data objects are transacted by transaction processors that match electronic data transaction request messages for data objects received from different client computers over a data communications network, the method comprising:
- receiving, by a transaction processor, a first electronic data transaction request message to perform a transaction of a first type on a data object, the first electronic data transaction request message including data representative of a first equation that includes a first variable and a second variable;
- determining, by the transaction processor, a first solution set based on the first equation and first parameters for the second variable, the first solution set including a plurality of combinations of values for the first variable and corresponding first parameters for the second variable, wherein the data representative of the first equation is smaller than data representative of the first solution set;
- determining, by the transaction processor, a previously received second electronic data transaction request message to perform a transaction of a second type on the data object, the previously received second electronic data transaction request message including data representative of a second equation that includes the first variable and the second variable, wherein the first transaction type is one of acquiring or relinquishing a quantity of a financial instrument associated with the data object, and wherein the second transaction type is the other of acquiring or relinquishing at least a portion of the quantity of the financial instrument associated with the data object;
- determining, by the transaction processor, a second solution set based on the second equation and second parameters for the second variable, the second solution set including a plurality of combinations of values for the first variable and corresponding second parameters for the second variable, wherein the data representative of the second equation is smaller than data representative of the second solution set;
- determining, by the transaction processor, whether the first and second solution sets intersect; and
- upon determining that the first and second solution sets intersect, processing, by the transaction processor, the transactions of the first and second electronic data transaction request messages based on the intersection of the first and second solution sets.

2. The computer implemented method of claim 1, further comprising storing the data representative of the first equation, the first solution set, the second equation, and the second solution set in a memory coupled with the transaction processor, wherein the data representative of the first equation requires less storage space in the memory than the first solution set, and wherein the data representative of the second equation requires less storage space in the memory than the second solution set.

3. The computer implemented method of claim 1, wherein the first electronic data transaction request message includes data representative of the first parameters for the second variable, and wherein the second electronic data transaction request message includes data representative of the second parameters for the second variable.

4. The computer implemented method of claim 1, wherein the transaction processor determines the first and second parameters for the second variable based on a predetermined range of parameters for the second variable.

5. The computer implemented method of claim 1, wherein the data object represents an underlying financial instrument, and wherein the first variable represents a premium price for a derivative financial instrument derived from the underlying financial instrument.

6. The computer implemented method of claim 5, wherein the data object represents a futures financial instrument, and wherein the first variable represents a premium price for an options financial instrument derived from the futures financial instrument.

7. The computer implemented method of claim 6, wherein the second variable represents one of a strike price or a maturity date associated with an options financial instrument derived from the futures financial instrument.

8. The computer implemented method of claim 7, wherein each of the first and second equations includes a third variable, and wherein the third variable represents the other of a strike price or a maturity date associated with the options financial instrument derived from the futures financial instrument.

9. The computer implemented method of claim 8, wherein each of the first and second electronic data transaction request messages includes data representative of parameters for the third variable.

10. The computer implemented method of claim 1, wherein the first transaction type is acquiring a quantity of a financial instrument associated with the data object and wherein the second transaction type is relinquishing a quantity of a financial instrument associated with the data object, the method further comprising:
- upon determining that the first and second solution sets do not intersect, determining, by the transaction processor, whether any one of the values for the first variable corresponding to one of the first parameters for the second variable in the first solution set is greater than the value of the first variable corresponding to the same parameter for the second variable in the second solution set; and
- upon determining that one of the values for the first variable corresponding to one of the first parameters for the second variable in the first solution set is greater than the value of the first variable corresponding to the same parameter for the second variable in the second solution set, processing, by the transaction processor, a transaction based on a combination of the determined value for the first variable and its corresponding parameter for the second variable.

11. The computer implemented method of claim 10, wherein the first electronic data transaction request message is associated with a first quantity, wherein each of the parameters for the second variable represents a different financial instrument, and wherein data associated with each different financial instrument is stored in a different order book object, the method further comprising:
- upon determining that the first and second solution sets do not intersect, and upon determining that any one of the values for the first variable corresponding to one of the first parameters for the second variable in the first solution set is not greater than the value of the first variable corresponding to the same parameter for the second variable in the second solution set, determining, by the transaction processor, whether any one of the values for the first variable corresponding to one of the first parameters for the second variable in the first solution set is less than the value of the first variable corresponding to the same parameter for the second variable in the second solution set; and
- upon determining that one of the values for the first variable corresponding to one of the first parameters for the second variable in the first solution set is less than the value of the first variable corresponding to the same parameter for the second variable in the second solution set, storing the first quantity and one of the combinations of values and parameters in the first solution set in the order book object corresponding to the respective parameter.

12. The computer implemented method of claim 1, further comprising determining that the first and second solution sets intersect by determining that each of the first and second solution sets includes at least one same combination of a value for the first variable and its corresponding parameter for the second variable.

13. The computer implemented method of claim 12, further comprising:
   determining that each of the first and second solution sets includes at least two same combinations of a value for the first variable and its corresponding parameter for the second variable;
   selecting one of the at least two same combinations of a value for the first variable and its corresponding parameter for the second variable based on pre-defined priority rules; and
   processing a transaction based on the selected combination of a value for the first variable and its corresponding parameter for the second variable.

14. A computer implemented method for processing electronic data transaction request messages in a data transaction processing system in which data objects are transacted by transaction processors that match electronic data transaction request messages for data objects received from different client computers over a data communications network, the method comprising:
   receiving, by a linking processor, an equation-based electronic data transaction request message to perform a transaction of a first transaction type on a data object, the equation-based electronic data transaction request message including data representative of a quantity and an equation including multiple variables;
   generating, by the linking processor, a plurality of discrete-value-based electronic data transaction request messages based on the equation-based electronic data transaction request message, each of the plurality of discrete-value-based electronic data transaction request messages associated with the first quantity and a different parameter for one of the multiple variables;
   forwarding, by the linking processor, each of the plurality of discrete-value-based electronic data transaction request messages to a corresponding transaction processor based on the respective parameter for one of the multiple variables;
   for each discrete-value-based electronic data transaction request message forwarded by the linking processor to a transaction processor, determining, by the transaction processor, whether attempting to match the forwarded discrete-value-based electronic data transaction request message with at least one previously received but unsatisfied discrete-value-based electronic data transaction request message for a transaction of a second transaction type which is counter thereto results in at least partial satisfaction of one or both of the forwarded discrete-value-based electronic data transaction request message and the at least one previously received but unsatisfied discrete-value-based electronic data transaction request message, wherein the first transaction type is one of acquiring or relinquishing the quantity of a financial instrument associated with the data object, and wherein the second transaction type is the other of acquiring or relinquishing at least a portion of the quantity of the financial instrument associated with the data object; and
   upon at least partial satisfaction of one or both of the forwarded discrete-value-based electronic data transaction request message and the at least one previously received but unsatisfied discrete-value-based electronic data transaction request message, indicating completion of a transaction there between by modifying, by the linking processor, the quantity associated with all of the other discrete-value-based electronic data transaction request messages other than the forwarded discrete-value-based electronic data transaction request message from the plurality of electronic data transaction request messages.

15. The computer implemented method of claim 14, wherein each transaction processor is associated with a separate order book object, the method further comprising, upon only partial satisfaction of the forwarded discrete-value-based electronic data transaction request message, storing the forwarded discrete-value-based electronic data transaction request message in the separate order book object associated with the transaction processor associated with the forwarded discrete-value-based electronic data transaction request message.

16. A computer implemented method for processing electronic data transaction request messages in a data transaction processing system in which data objects are transacted by transaction processors that match electronic data transaction request messages for data objects received from different client computers over a data communications network, the method comprising:
   receiving, by a transaction processor, an electronic data transaction request message comprising a transaction request to one of acquire or relinquish a quantity of a financial instrument associated with a data object including data representative of an equation that includes at least one variable;
   determining, by the transaction processor, a first solution set based on the equation in the electronic data transaction request message, the first solution set comprising a plurality of values, wherein the data representative of the equation is smaller than data representative of the solution set;
   determining, by the transaction processor, a set of previously received but unsatisfied electronic data transaction request messages comprising a transaction request for the other one of acquire or relinquish at least a portion of the quantity of the financial instrument associated with the data object which are counter to the received electronic data transaction request message, each of the previously received but unsatisfied electronic data transaction request messages including data representative of an equation that includes the at least one variable;
   determining, by the transaction processor, a second solution set based on the equation in at least one of the previously received but unsatisfied electronic data transaction request messages, the second solution set comprising a plurality of values;
   determining, by the transaction processor, whether the first solution set based on the equation in the electronic data transaction request message intersects with the second solution set based on the equation in at least one of the previously received but unsatisfied electronic data transaction request messages; and upon determining that the first solution set based on the equation in the electronic data transaction request message intersects with the second solution set based on the equation in at least one of the previously received but unsatisfied electronic data transaction request messages, processing, by the transaction processor, the transactions of the first and second electronic data transaction request messages based on the intersection.

17. A computer system for processing electronic data transaction request messages in a data transaction processing system in which data objects are transacted by transaction processors that match electronic data transaction request messages to perform a transaction on data objects received from different client computers over a data communications network, the system comprising:
   a plurality of order book objects, each order book object associated with a data object and storing data associated with electronic data transaction request messages including requests to perform a transaction on the data object; and
   a linking processor that:
      converts an equation-based electronic data transaction request message to perform a transaction of a first type and associated with a quantity to a plurality of discrete-value-based electronic data transaction request messages, each discrete-value-based electronic data transaction request message associated with the quantity and with one of the order book objects; and
      upon detecting that one of the quantities associated with one of the order book objects has been modified based on a transaction completed between a plurality of discrete-value-based electronic data transaction request messages and at least one previously received but unsatisfied discrete-value-based electronic data transaction request message for a transaction of a second transaction type which is counter thereto which results in at least partial satisfaction of one or both of the discrete-value-based electronic data transaction request messages and the at least one previously received but unsatisfied discrete-value-based electronic data transaction request message, wherein the first transaction type is one of acquiring or relinquishing the quantity of a financial instrument associated with the data object, and wherein the second transaction type is the other of acquiring or relinquishing at least a portion of the quantity of the financial instrument associated with the data object, modifies all of the other order book objects based on the modification.

18. The computer system of claim 17, further comprising a plurality of transaction processors, each transaction processor configured to:
   receive one of the plurality of discrete-value-based electronic data transaction request messages;
   determine whether attempting to match the received discrete-value-based electronic data transaction request message with at least one previously received but unsatisfied discrete-value-based electronic data transaction request message for a transaction which is counter thereto results in at least partial satisfaction of one or both of the received discrete-value-based electronic data transaction request message and the at least one previously received but unsatisfied discrete-value-based electronic data transaction request message; and
   upon at least partial satisfaction of one or both of the received discrete-value-based electronic data transaction request message and the at least one previously received but unsatisfied discrete-value-based electronic data transaction request message, modify the order book object associated with the discrete-value-based electronic data transaction request message.

19. A computer system for processing electronic data transaction request messages in a data transaction processing system in which data objects are transacted by transaction processors that match electronic data transaction request messages for data objects received from different client computers over a data communications network, the system comprising a transaction processor and a memory coupled therewith, the transaction processor configured to:
   receive a first electronic data transaction request message to perform a transaction of a first type on a data object, the first electronic data transaction request message including data representative of a first equation that includes a first variable and a second variable;
   determine a first solution set based on the first equation and first parameters for the second variable, the first solution set including a plurality of combinations of values for the first variable and corresponding first parameters for the second variable, wherein the data representative of the first equation is smaller than data representative of the first solution set;
   determine a previously received second electronic data transaction request message to perform a transaction of a second type on the data object, the previously received second electronic data transaction request message including data representative of a second equation that includes the first variable and the second variable, wherein the first transaction type is one of acquiring or relinquishing a quantity of a financial instrument associated with the data object, and wherein the second transaction type is the other of acquiring or relinquishing at least a portion of the quantity of the financial instrument associated with the data object;
   determine a second solution set based on the second equation and second parameters for the second variable, the second solution set including a plurality of combinations of values for the first variable and corresponding second parameters for the second variable, wherein the data representative of the second equation is smaller than data representative of the second solution set;
   determine whether the first and second solution sets intersect; and
   upon determining that the first and second solution sets intersect, process the transactions of the first and second electronic data transaction request messages based on the intersection of the first and second solution sets.

20. A computer system comprising:
   means for receiving a first electronic data transaction request message to perform a transaction of a first type on a data object, the first electronic data transaction request message including data representative of a first equation that includes a first variable and a second variable;
   means for determining a first solution set based on the first equation and first parameters for the second variable, the first solution set including a plurality of combinations of values for the first variable and corresponding first parameters for the second variable, wherein the data representative of the first equation is smaller than data representative of the first solution set;
   means for determining a previously received second electronic data transaction request message to perform a transaction of a second type on the data object, the previously received second electronic data transaction request message including data representative of a second equation that includes the first variable and the second variable, wherein the first transaction type is one of acquiring or relinquishing a quantity of a financial instrument associated with the data object, and wherein the second transaction type is the other of acquiring or relinquishing at least a portion of the quantity of the financial instrument associated with the data object;

means for determining a second solution set based on the second equation and second parameters for the second variable, the second solution set including a plurality of combinations of values for the first variable and corresponding second parameters for the second variable, wherein the data representative of the second equation is smaller than data representative of the second solution set;

means for determining whether the first and second solution sets intersect; and upon determining that the first and second solution sets intersect, means for processing the transactions of the first and second electronic data transaction request messages based on the intersection of the first and second solution sets.

\* \* \* \* \*